United States Patent
Khandekar

(10) Patent No.: US 11,568,666 B2
(45) Date of Patent: Jan. 31, 2023

(54) METHOD AND SYSTEM FOR HUMAN-VISION-LIKE SCANS OF UNSTRUCTURED TEXT DATA TO DETECT INFORMATION-OF-INTEREST

(71) Applicant: Instaknow.com, Inc, Edison, NJ (US)

(72) Inventor: Pramod Khandekar, San Ramon, CA (US)

(73) Assignee: Instaknow.com, Inc, Edison, NJ (US)

( * ) Notice: Subject to any disclaimer, the term of this patent is extended or adjusted under 35 U.S.C. 154(b) by 360 days.

(21) Appl. No.: 16/984,625

(22) Filed: Aug. 4, 2020

(65) Prior Publication Data

US 2021/0042518 A1 Feb. 11, 2021

Related U.S. Application Data

(60) Provisional application No. 62/883,387, filed on Aug. 6, 2019.

(51) Int. Cl.
*G06V 30/416* (2022.01)
*G06F 16/383* (2019.01)

(52) U.S. Cl.
CPC .......... *G06V 30/416* (2022.01); *G06F 16/383* (2019.01)

(58) Field of Classification Search
CPC .......................... G06V 30/416; G06F 16/383
See application file for complete search history.

(56) References Cited

U.S. PATENT DOCUMENTS

| | | | | |
|---|---|---|---|---|
| 6,581,057 | B1* | 6/2003 | Witbrock | G06F 16/345 715/251 |
| 2001/0021279 | A1* | 9/2001 | Nakajima | H04N 1/40062 382/311 |
| 2004/0148278 | A1* | 7/2004 | Milo | G06F 40/16 707/E17.118 |
| 2008/0001953 | A1* | 1/2008 | Nagao | G06T 1/20 345/522 |
| 2010/0293451 | A1* | 11/2010 | Carus | G06F 16/36 715/256 |
| 2013/0275399 | A1* | 10/2013 | Amit | G06F 16/2365 707/693 |
| 2019/0065589 | A1* | 2/2019 | Wen | G06F 16/353 |
| 2020/0104288 | A1* | 4/2020 | Tao | G06N 20/00 |
| 2020/0257737 | A1* | 8/2020 | Herranen | G06N 3/0445 |

* cited by examiner

*Primary Examiner* — King Y Poon
*Assistant Examiner* — Michael L Burleson
(74) *Attorney, Agent, or Firm* — Preston Smirman; Smirman IP Law, PLLC

(57) ABSTRACT

A method, system and computer program for automatic, highly accurate machine scans of unstructured text data sources, like information kept or displayed in Web browsers, WORD, POWERPOINT, EXCEL, PDF, and other documents, with the ability to detect, isolate and extract specific text information from unknown and varying locations within the unstructured text data. The system uses multiple human-vision-like but electronic scans of the unstructured data using artificial intelligence techniques to locate, and extract required information despite varying conditions, like unknown number of pages, unknown sequence of pages, unknown data layouts and data arrangements, unknown number, lengths and indentations of sections/paragraphs, and in case of tabular data, unknown number of rows and column sequences in the unstructured text data source.

23 Claims, 38 Drawing Sheets

FIG. 1  Examples of varying layouts in Balance Sheets

PRIOR ART

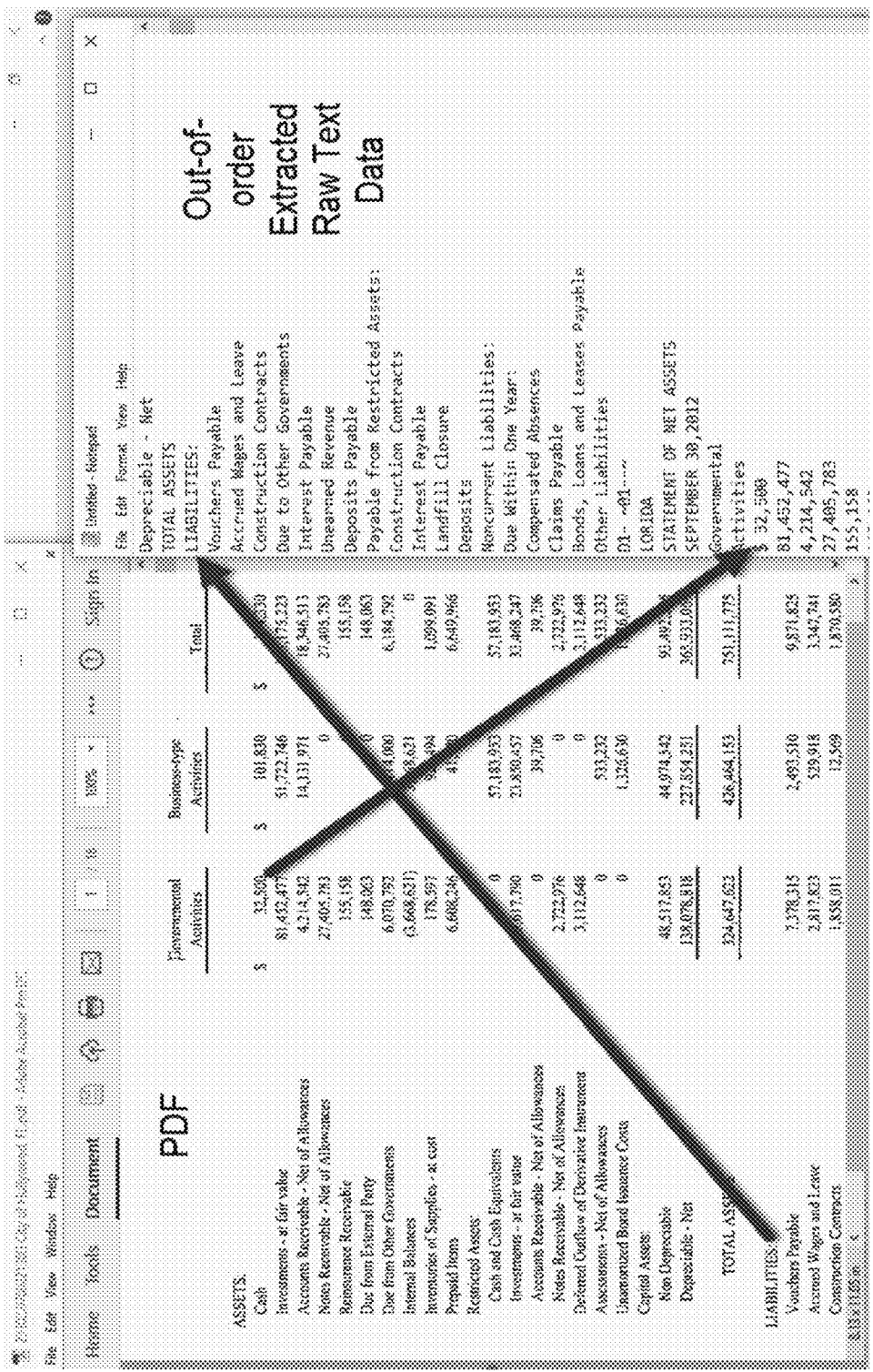
FIG. 2  Example of PDF file whose extracted raw text is out of order
PRIOR ART FIG. 3    Overview of System
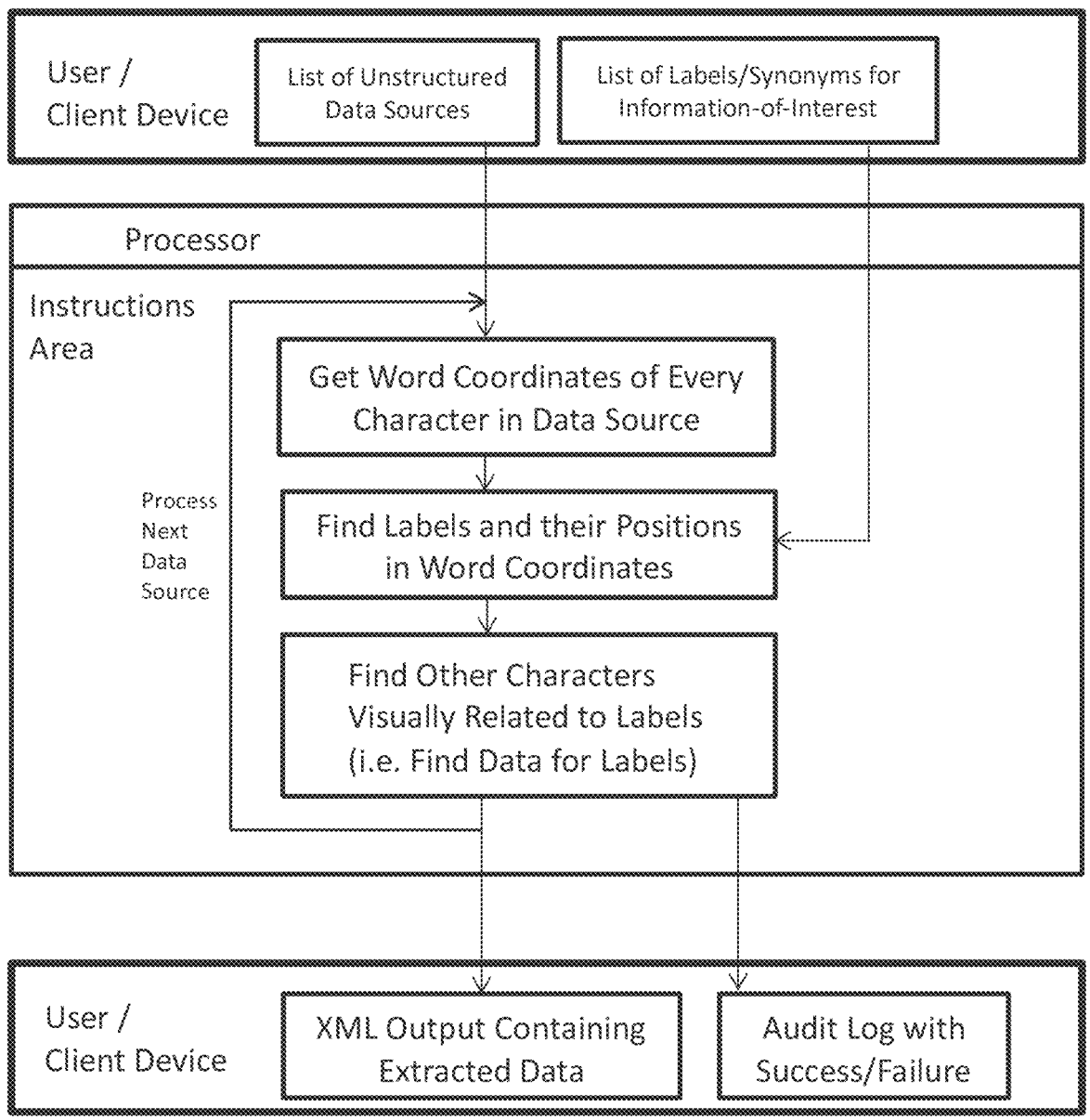

FIG. 4  Example of user-provided labels, their synonyms, and listing of Information-of-interest

| | A | B | C |
|---|---|---|---|
| 1 | Labels for Information of Interest from Balance Sheets | | |
| 2 | | | |
| 3 | Information_of_Interest | Information is_Visually_Related_to_Label(s) | Searched in "Word Coordinates" in System memory to |
| 4 | Capital_Assets_2018_Amount | Below Fiscal_Year_Column_Identifier AND RightOf Capital_Assets_Line_Identifier | Isolate the "Capital Assets for Fiscal Year 2018" amount |
| 5 | Company_Name | SameAs Company_Name_Identifier | Isolate the "Statement Date" from top of the Balance Sheet |
| 6 | | | |
| 7 | | | |
| 8 | Label_Name | Label_Text_and_Synonyms | Searched in "Word Coordinates" in System memory to |
| 9 | Document_Identifier | Balance Sheet | Statement of Net Positions | Statement of Net Assets | Confirm that current document is a Balance Sheet document |
| 10 | Assets_Section_Identifier | Assets | Assets on Books | Find the start of "Assets" section in document |
| 11 | Capital_Assets_Line_Identifier | Capital Assets | Assets - Capital | Find the line in document that contains one of matching synonyms |
| 12 | Fiscal_Year_Column_Identifier | Fiscal Year 2018 | FY 2018 | Find the column in document that contains one of the matched synonyms |
| 13 | Company_Name_Identifier | RegEx=[a-zA-Z0-9\.]*(INC\.|Incorporated) | Find company name from the top of the Balance Sheet page |
| 14 | | | |
| 15 | | | |

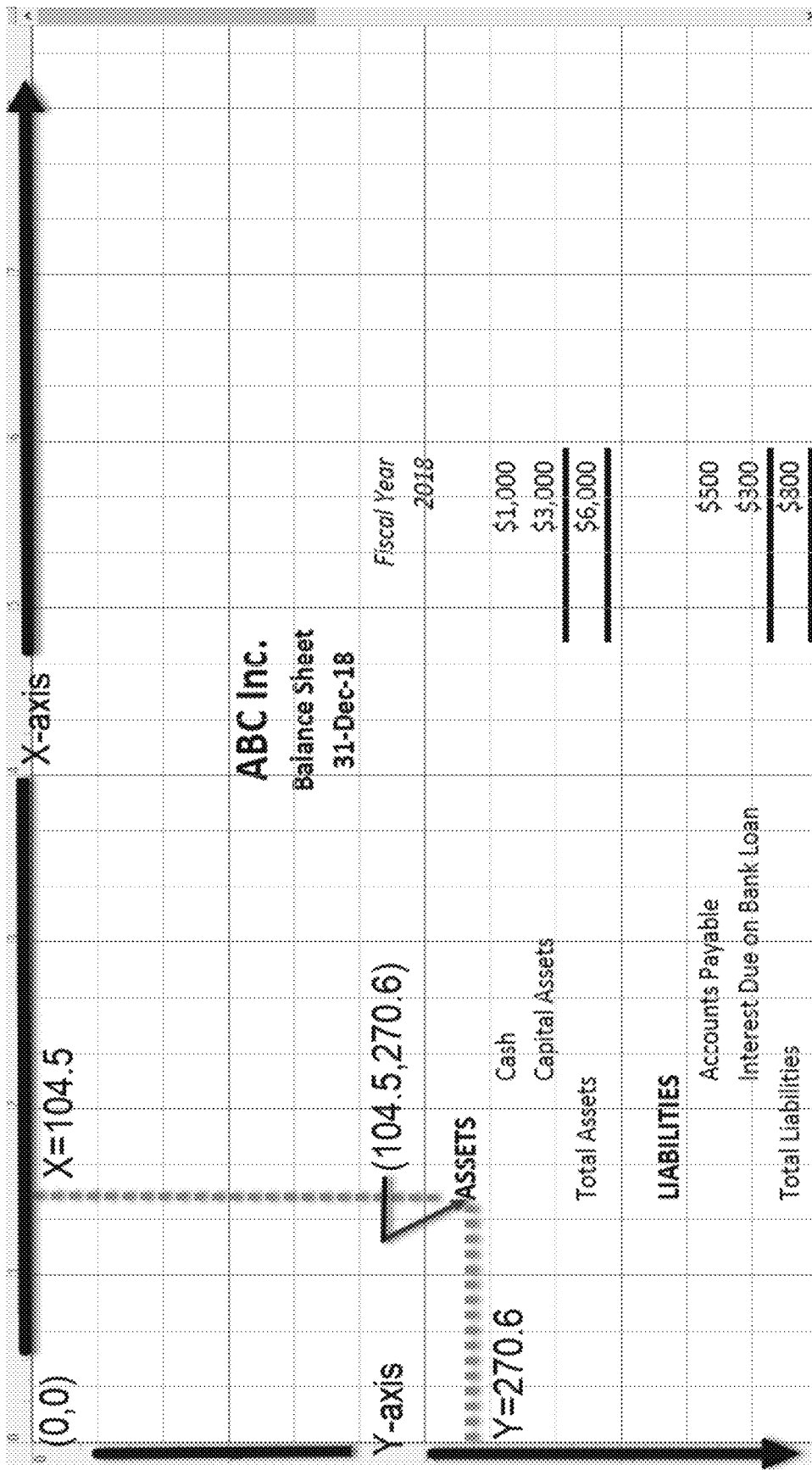
FIG. 5  Example of (X,Y) coordinates of the left edge of a word

FIG. 6    Example of X, Y coordinates of words

| | Fill_Color | FontName | Page_No | Stroke_Color | Word | X_Bottom_Left | X_Bottom_Right | Y_Bottom_Left | Y_Top_Left |
|---|---|---|---|---|---|---|---|---|---|
| 1 | 0 | BCDEEE+Calibri-Bold | 1 | 0 | ABC | 285.5 | 338.5 | 194.2 | 712.8 |
| 2 | 0 | BCDEEE+Calibri-Bold | 1 | 0 | Inc. | 320.1 | 338.1 | 194.2 | 712.8 |
| 3 | 0 | BCDEEE+Calibri-Bold | 1 | 0 | Balance | 281.2 | 312.2 | 211.1 | 695.9 |
| 4 | 0 | BCDEEE+Calibri-Bold | 1 | 0 | Sheet | 322.9 | 346.9 | 211.1 | 695.9 |
| 5 | 0 | BCDEEE+Calibri-Bold | 1 | 0 | 31-Dec-18 | 280.9 | 329.9 | 226.3 | 680.7 |
| 6 | 0 | BCDFEE+Calibri-Italic | 1 | 0 | Fiscal | 378.1 | 397.1 | 240.7 | 666.3 |
| 7 | 0 | BCDFEE+Calibri-Italic | 1 | 0 | Year | 405.2 | 421.2 | 240.7 | 666.3 |
| 8 | 0 | BCDFEE+Calibri-Italic | 1 | 0 | 2018 | 402.8 | 418.8 | 255.3 | 651.7 |
| 9 | 0 | BCDEEE+Calibri-Bold | 1 | 0 | ASSETS | 104.5 | 138.5 | 270.6 | 636.4 |
| 10 | 0 | BCDGEE+Calibri | 1 | 0 | Cash | 156 | 173 | 285.1 | 621.9 |
| 11 | 0 | BCDGEE+Calibri | 1 | 0 | $1,000 | 392.8 | 413.8 | 285.1 | 621.9 |
| 12 | 0 | BCDGEE+Calibri | 1 | 0 | Capital | 156 | 177 | 299.4 | 607.6 |
| 13 | 0 | BCDGEE+Calibri | 1 | 0 | Assets | 189.5 | 211.5 | 299.4 | 607.6 |
| 14 | 0 | BCDGEE+Calibri | 1 | 0 | $3,000 | 392.8 | 413.8 | 299.4 | 607.6 |
| 15 | 0 | BCDGEE+Calibri | 1 | 0 | Total | 104.4 | 121.4 | 314.7 | 592.3 |
| 16 | 0 | BCDGEE+Calibri | 1 | 0 | Assets | 129.7 | 151.7 | 314.7 | 592.3 |
| 17 | 0 | BCDGEE+Calibri | 1 | 0 | $6,000 | 392.8 | 413.8 | 314.7 | 592.3 |
| 18 | 0 | BCDEEE+Calibri-Bold | 1 | 0 | LIABILITIES | 104.5 | 153.5 | 345.4 | 561.6 |
| 19 | 0 | BCDGEE+Calibri | 1 | 0 | Accounts | 156 | 184 | 359.9 | 547.1 |
| 20 | 0 | BCDGEE+Calibri | 1 | 0 | Payable | 198.7 | 223.7 | 359.9 | 547.1 |
| 21 | 0 | BCDGEE+Calibri | 1 | 0 | $500 | 401.2 | 417.2 | 359.9 | 547.1 |
| 22 | 0 | BCDGEE+Calibri | 1 | 0 | Interest | 156 | 180 | 374.2 | 532.8 |
| 23 | 0 | BCDGEE+Calibri | 1 | 0 | Due | 193.7 | 207.7 | 374.2 | 532.8 |

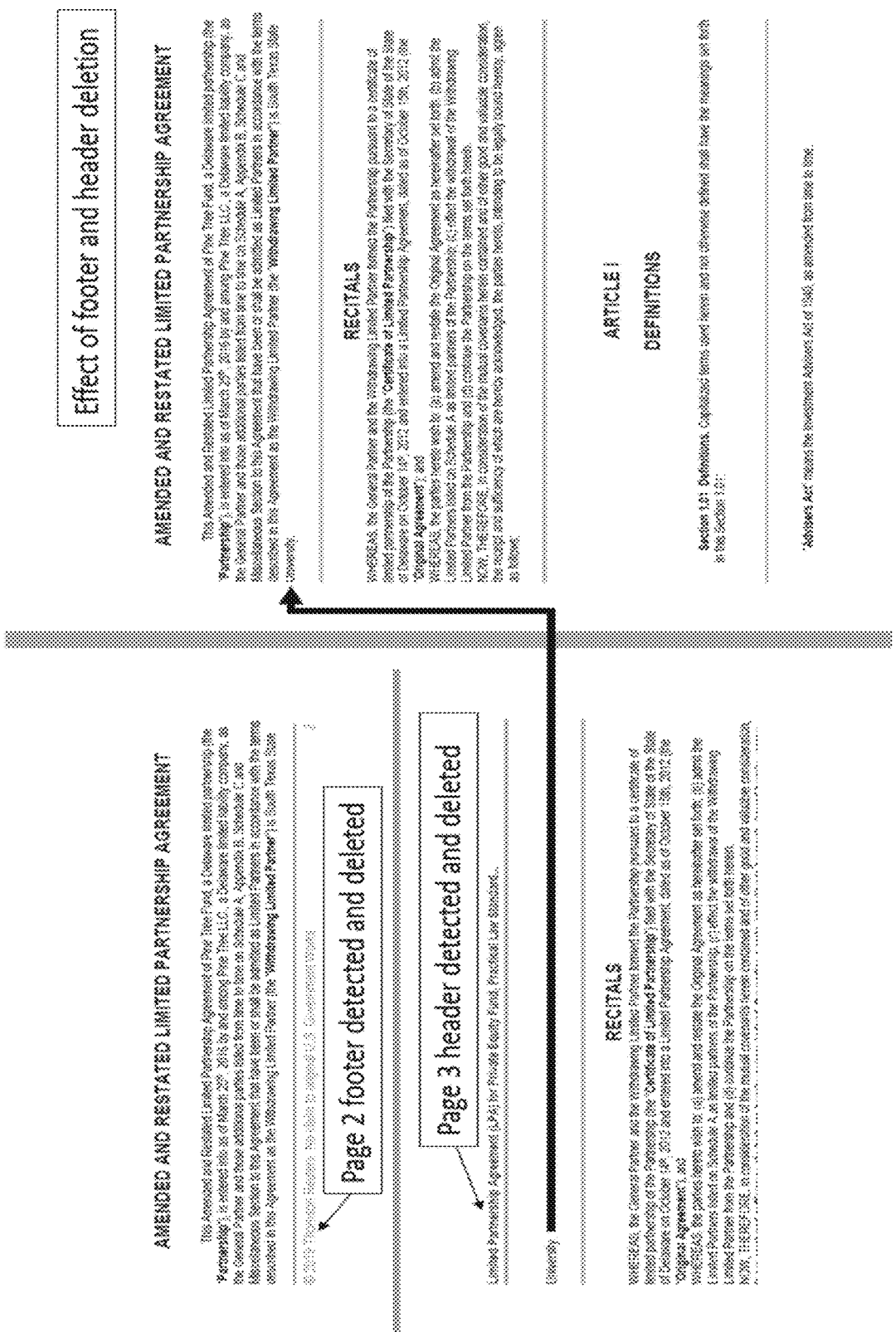
FIG. 7  Effect of detecting and deleting page footers and headers

FIG. 8    Original pages stitched together in one long page
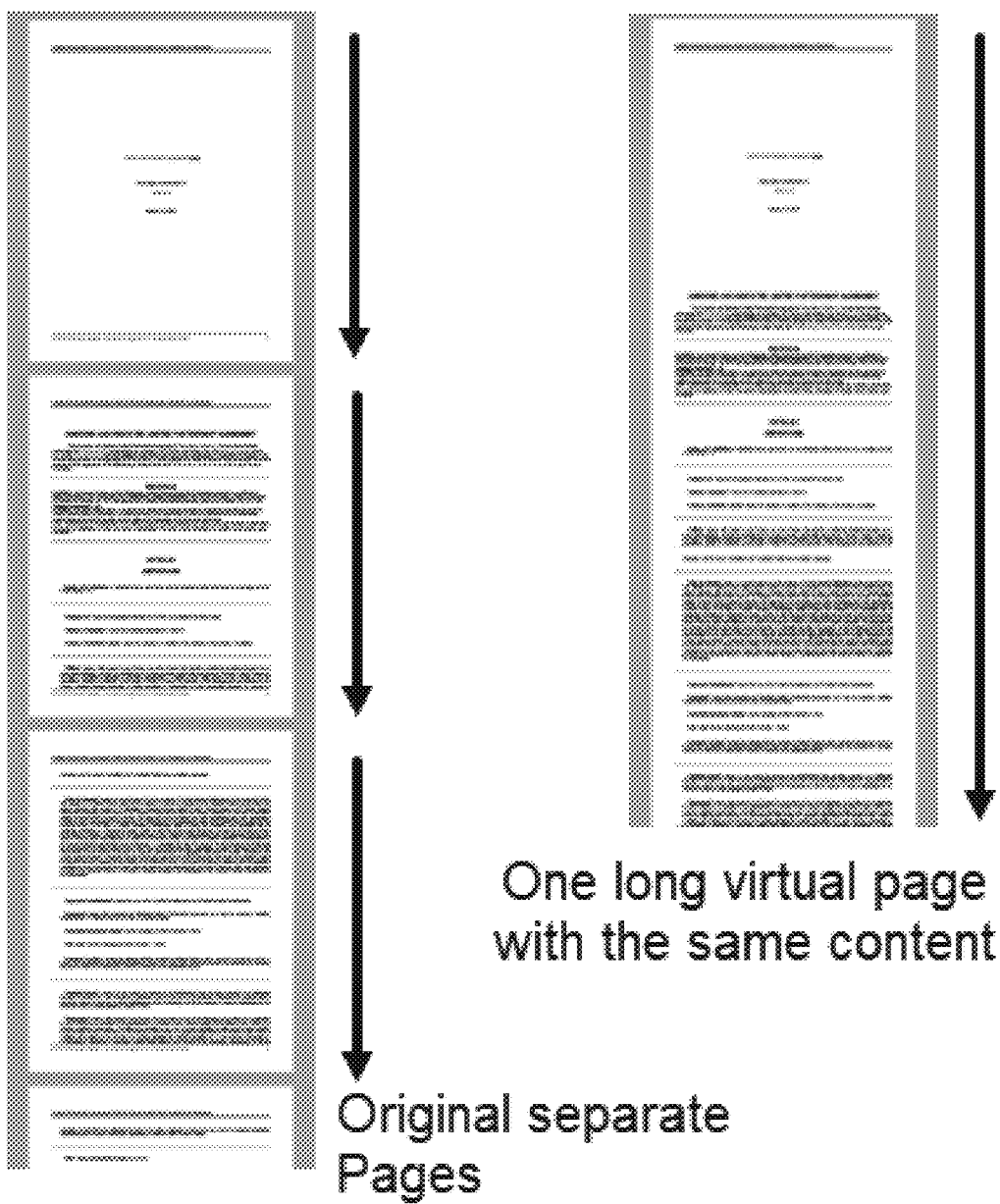

FIG. 9    Word Coordinates for words visually below " Fiscal Year 2018"

| Fill_Color | FontName | Page_No | Stroke_Color | Word | X_Bottom_Left | X_Bottom_Right | Y_Bottom_Left | Y_Top_Left |
|---|---|---|---|---|---|---|---|---|
| 0 | BODGEE+Calibri | 1 | 0 | $1,000 | 382.8 | 413.8 | 265.1 | 621.9 |
| 0 | BODGEE+Calibri | 1 | 0 | $3,000 | 382.8 | 413.8 | 268.4 | 627.6 |
| 0 | BODGEE+Calibri | 1 | 0 | $6,000 | 382.8 | 413.8 | 314.7 | 592.3 |
| 0 | BODGEE+Calibri | 1 | 0 | $600 | 401.2 | 417.2 | 359.9 | 547.1 |
| 0 | BODGEE+Calibri | 1 | 0 | $300 | 401.2 | 417.2 | 374.2 | 532.8 |
| 0 | BODGEE+Calibri | 1 | 0 | $800 | 401.2 | 417.2 | 389.5 | 517.5 |
| 0 | BODGEE+Calibri | 1 | 0 | $5,200 | 382.8 | 392.8 | 436.2 | 471.8 |

FIG. 10 System's emulation of human-vision-like intersection of user-provided labels "Fiscal_Year_Column_Identifier" and "Capital_Assets_Line_Identifier" isolates the correct amount despite layout FIG. 11 Example of a document signature section having data above labels

MORTGAGE LOAN ORIGINATOR | APPLICANT(S)

Financial Services Inc.
Company Name

21 North ▊ Street
Address

▊burg, PA ▊
City, State, Zip 610-282-▊ / 610-282 ▊
Phone/Fax

Mihir ▊
Applicant Name(s)

2396 ▊ Terrace
Address

▊ PA ▊
City, State, Zip

_____ Date
Borrower Signature

_____ Date
Co-Borrower Signature

_____ Date
Broker or Authorized Agent Signature

FIG. 12 Example of XML containing data from "ABC Inc." Balance Sheet

```xml
<?xml version="1.0" encoding="ISO-8859-1"?>
<One_File_Data>
 - <Document Document_Type="Information of Interest from Balance Sheets">
   - <One_Data_Row>
       <Capital_Assets_2018_Amount>$3,000</Capital_Assets_2018_Amount>
       <Company_Name>ABC Inc.</Company_Name>
       <SOURCE_FILE_NAME>C:\InstaKnow\HIA\Balance Sheet 1.PDF</SOURCE_FILE_NAME>
       <PAGE_NUMBER>1.1</PAGE_NUMBER>
       <PAGE_EXTRACTION_NAME>Information of Interest from Balance Sheets</PAGE_EXTRACTION_NAME>
       <PROCESSING_MESSAGES/>
       <PROCESSING_RESULTS>Successful</PROCESSING_RESULTS>
     </One_Data_Row>
   </Document>
</One_File_Data>
```

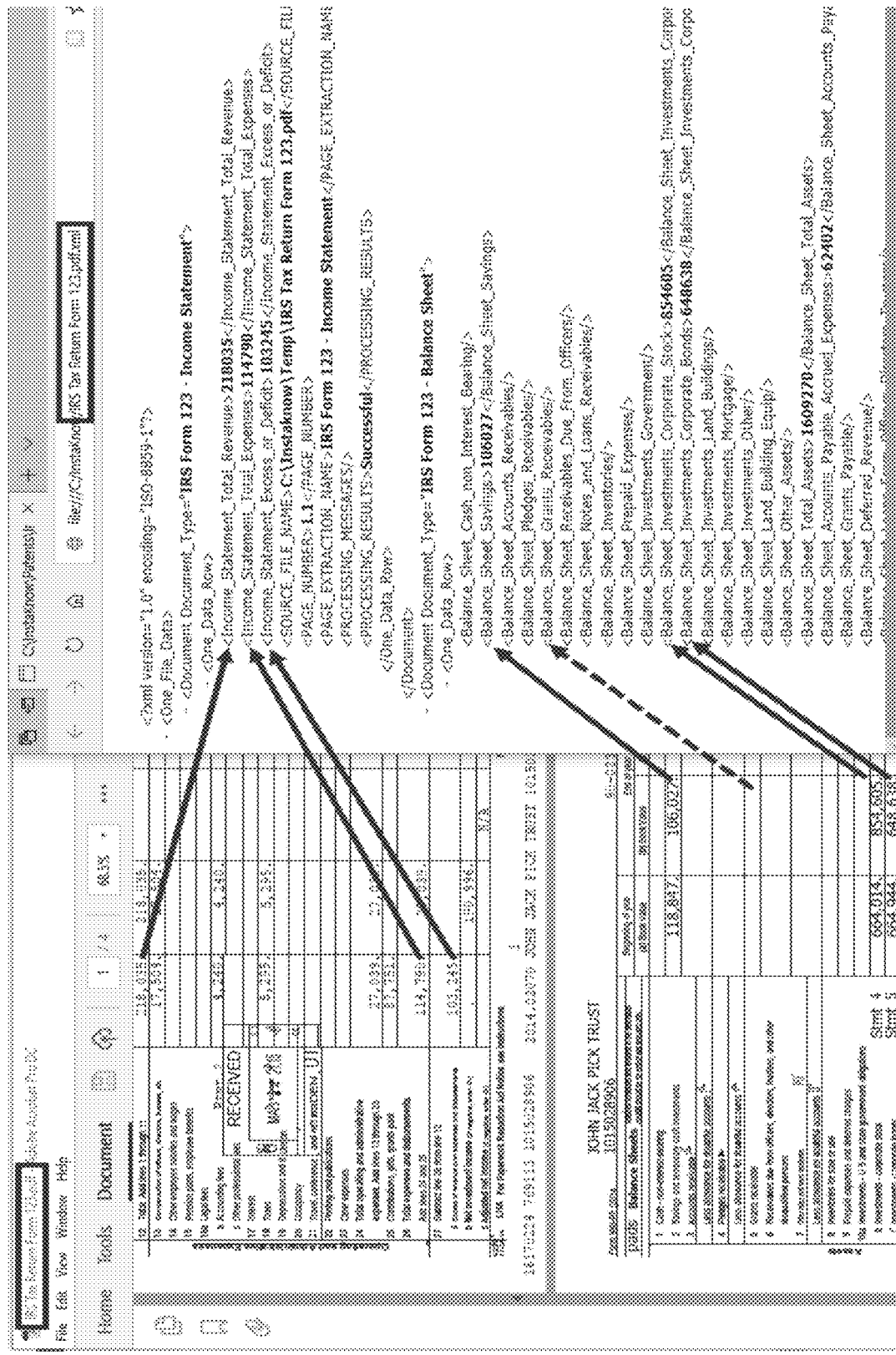
FIG. 13    Example of XML with data extracted from a tax return

FIG. 14A    Example data layout in shipping document, showing data below labels

ARRIVAL NOTICE

| | VESSEL NAME | VOYAGE No. | Estimated Arrival Date |
|---|---|---|---|
| A | MSC STELLA | 731W | 8/31/2017 |
| B | | | |

| | FLAG REGISTRY | BILL OF LADING No. | PRINT DATE |
|---|---|---|---|
| A | Panama | MSCUMA882580 | 8/28/2017 |
| B | | | |

In the case of a transshipment the second-line vessel (b) is U.S. final discharge.

| NATION | No. Cont. | No. Pkgs. | WEIGHT (Kgs.) | MEASURE(Cbm) |
|---|---|---|---|---|
| | 5 | 12,948 | 98,870 | 190 |

FIG. 14B    Example of a "Large horizontal gap", i.e. gap of more than One-Space-Width

ARRIVAL NOTICE

| | VESSEL NAME | VOYAGE No. | Estimated Arrival Date |
|---|---|---|---|
| A | MSC STELLA | 731W | 8/31/2017 |
| B | | | |

| | FLAG REGISTRY | BILL OF LADING No. | PRINT DATE |
|---|---|---|---|
| A | Panama | MSCUMA882580 ←——→ | 8/28/2017 |
| B | | | |

In the case of a transshipment the second-line vessel (b) is U.S. final discharge.   *Large horizontal gap*

| NATION | No. Cont. | No. Pkgs. | WEIGHT (Kgs.) | MEASURE(Cbm) |
|---|---|---|---|---|
| | 5 | 12,948 | 98,870 | 190 |

FIG. 14C   Example of a "Large vertical gap", i.e. gap of more than One-Line-Height

ARRIVAL NOTICE

| | VESSEL NAME | VOYAGE No. | Estimated Arrival Date |
|---|---|---|---|
| A | MSC STELLA | 731W | 8/31/2017 |
| B | | | |// | FLAG REGISTRY | BILL OF LADING No. | PRINT DATE |
| A | Panama | MSCUMA882580 | 8/28/2017 |
| B | | | |

In the case of a transshipment the second-line vessel (b) is U.S. final discharge.   ← *Large vertical gap*

| NATION | No. Cont. | No. Pkgs. | WEIGHT (Kgs.) | MEASURE(Cbm) |
|---|---|---|---|---|
| | 5 | 12,948 | 98,870 | 190 |

FIG. 14D   Area containing words to the right and below the label "BILL OF LADING No."

ARRIVAL NOTICE

| | VESSEL NAME | VOYAGE No. | Estimated Arrival Date |
|---|---|---|---|
| A | MSC STELLA | 731W | 8/31/2017 |
| B | | | |
| | FLAG REGISTRY | BILL OF LADING No. | PRINT DATE |
| A | Panama | MSCUMA882580 | 8/28/2017 |
| B | | | |

In the case of a transshipment the second-line vessel (b) is U.S. final discharge.

| NATION | No. Cont. | No. Pkgs. | WEIGHT (Kgs.) | MEASURE(Cbm) |
|---|---|---|---|---|
| | 5 | 12,948 | 98,870 | 190 |

FIG. 14E  Only the correct word is isolated after excluding words separated by large horizontal and vertical gaps

ARRIVAL NOTICE

| | VESSEL NAME | VOYAGE No. | Estimated Arrival Date |
|---|---|---|---|
| A | MSC STELLA | 731W | 8/31/2017 |
| B | | | |
| | FLAG REGISTRY | BILL OF LADING No. | PRINT DATE |
| A | Panama | ░░░░░░░░░ | 8/28/2017 |
| B | | | |

In the case of a transshipment the second-line vessel (b) is U.S. final discharge.

| NATION | No. Cont. | No. Pkgs. | WEIGHT (Kgs.) | MEASURE(Cbm) |
|---|---|---|---|---|
| | 5 | 12,948 | 98,870 | 190 |

FIG. 14F  Words that are visually contiguous are correctly included for label "VESSEL NAME"

ARRIVAL NOTICE

| | VESSEL NAME | VOYAGE No. | Estimated Arrival Date |
|---|---|---|---|
| A | MSC STELLA | 731W | 8/31/2017 |
| B | | | |
| | FLAG REGISTRY | BILL OF LADING No. | PRINT DATE |
| A | Panama | MSCUMA862580 | 8/28/2017 |
| B | | | |

In the case of a transshipment the second-line vessel (b) is U.S. final discharge.

| NATION | No. Cont. | No. Pkgs. | WEIGHT (Kgs.) | MEASURE(Cbm) |
|---|---|---|---|---|
| | 5 | 12,948 | 98,870 | 190 |

FIG. 15A   Example data layout in shipping document, showing data to the right of labels "BILL OF LADING NO." and "SHIPPER REFERENCE:"

| ARRIVAL NOTICE | Sea WayBill |
| --- | --- |
| | BILL OF LADING NO.   COSU6185036700 |
| | SHIPPER REFERENCE: 4359040081005300 |
| | PO NUMBER: |
| CONSIGNEE<br>WELLS FARGO BANK NA, NATIONAL<br>ASSOCIATION, STE 340, 200 PARK AVENUE,<br>SYCAMORE 2A, NEW YORK, NY 10017<br>AS ADMINISTRATIVE AGENT AND<br>CONSIGNEE OF HAMILTON BEACH BRANDS | NOTIFY PARTY<br>(1)HAMILTON BEACH BRANDS, INC.<br>4421 WATERFRONT DRIVE<br>GLEN ALLEN, VA 23060 |

FIG. 15B   Inclusion-Area of label "BILL OF LADING NO."

| ARRIVAL NOTICE | Sea WayBill |
| --- | --- |
| | BILL OF LADING NO.   COSU6185036700 |
| | SHIPPER REFERENCE: 4359040081005300 |
| | PO NUMBER: |
| CONSIGNEE<br>WELLS FARGO BANK NA, NATIONAL<br>ASSOCIATION, STE 340, 200 PARK AVENUE,<br>SYCAMORE 2A, NEW YORK, NY 10017<br>AS ADMINISTRATIVE AGENT AND<br>CONSIGNEE OF HAMILTON BEACH BRANDS | NOTIFY PARTY<br>(1)HAMILTON BEACH BRANDS, INC.<br>4421 WATERFRONT DRIVE<br>GLEN ALLEN, VA 23060 |

FIG. 15C   The nearby label "SHIPPER REFERENCE:" correctly narrows down the words in the Inclusion-Area of label "BILL OF LADING No."

| ARRIVAL NOTICE | Sea WayBill |
| --- | --- |
| | BILL OF LADING NO.   COSU6185036700 |
| | SHIPPER REFERENCE: 4359040081005300 |
| | PO NUMBER: |
| CONSIGNEE<br>WELLS FARGO BANK NA, NATIONAL<br>ASSOCIATION, STE 340, 200 PARK AVENUE,<br>SYCAMORE 2A, NEW YORK, NY 10017<br>AS ADMINISTRATIVE AGENT AND<br>CONSIGNEE OF HAMILTON BEACH BRANDS | NOTIFY PARTY<br>(1)HAMILTON BEACH BRANDS, INC.<br>4421 WATERFRONT DRIVE<br>GLEN ALLEN, VA 23060 |

SPECIALIZED SKILLS

- Extensive experience working in an Agile/Scrum and certified scrum master.
- Profound knowledge of development of service-oriented applications and APIs.
- Strong experience developing scalable backend applications in Python using Flask and AWS Lambda.
- Knowledge of front-end technologies including React, Angular, Javascript, HTML5, CSS and SASS.
- Experience creating continuous integration and delivery pipelines.
- Excellent verbal and written communication skills, leadership and drive to achieve.

FIG. 16 A " SPECIALIZED SKILLS" section from a resume

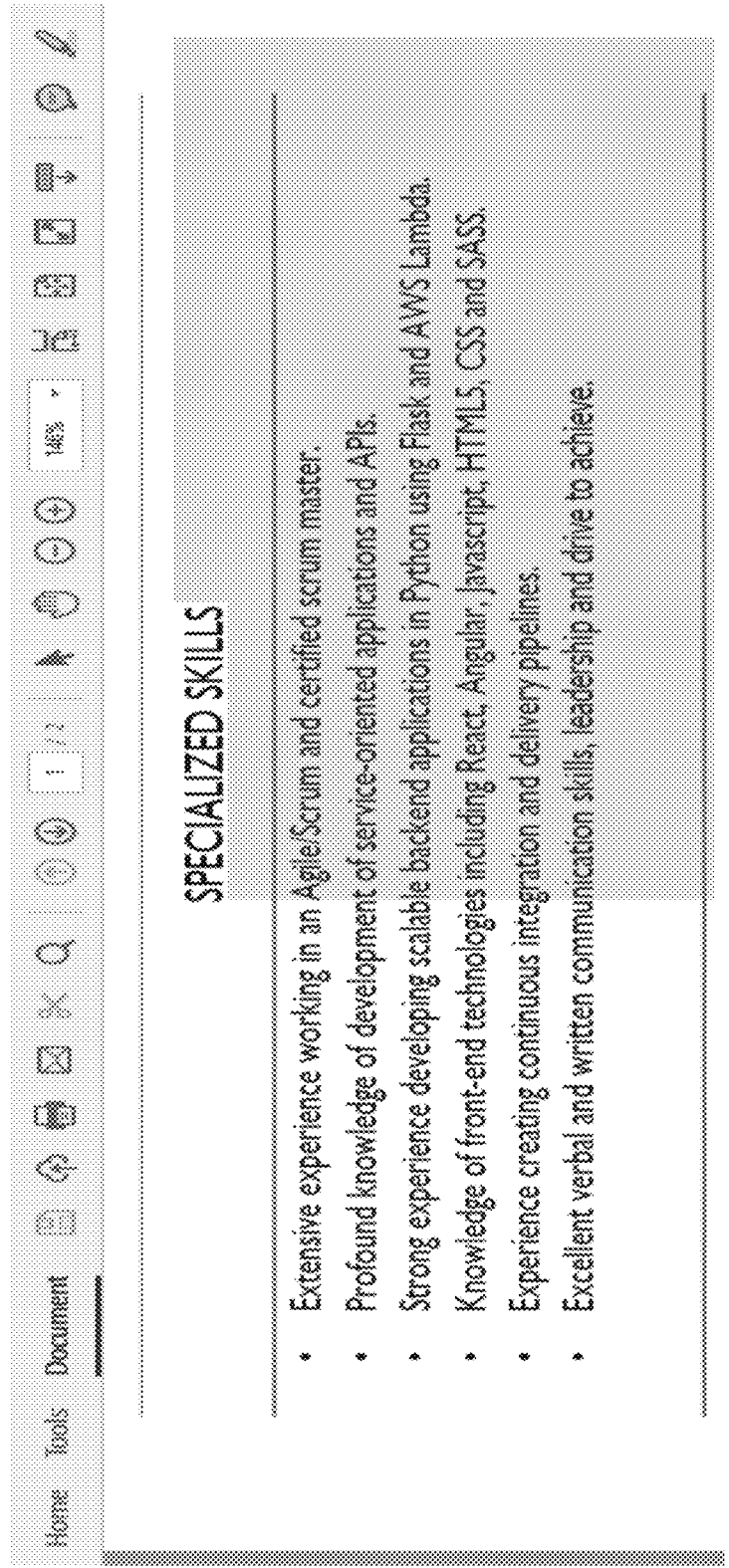
FIG. 16B  Inclusion-Area for label " Specialized Skills"

FIG. 16C   Words originally isolated from Inclusion-Area of label "SPECIALIZED SKILLS" (Note that the words from the left part of the paragraph are missing)

Agile/Scrum and certified scrum master.
of service-oriented applications and APIs.
scalable backend applications in Python using Flask and AWS Lambda.
technologies including React, Angular, Javascript, HTML5, CSS and SASS.
integration and delivery pipelines.
communication skills, leadership and drive to achieve.

FIG. 16D  Words isolated after scanning to the left of each line and adding contiguous words from the left part of the paragraph Extensive experience working in an Agile/Scrum and certified scrum master.
- Profound knowledge of development of service-oriented applications and APIs.
- Strong experience developing scalable backend applications in Python using Flask and AWS Lambda.
- Knowledge of front-end technologies including React, Angular, Javascript, HTML5, CSS and SASS.
- Experience creating continuous integration and delivery pipelines.
- Excellent verbal and written communication skills, leadership and drive to achieve.

FIG. 16E  Finally extracted string for information-of-interest visually related to label "SPECIALIZED SKILLS" as it would be in output XML <Specialized_skills>Extensive experience working in an Agile/Scrum and certified scrum master. • Profound knowledge of development of service-oriented applications and APIs. • Strong experience developing scalable backend applications in Python using Flask and AWS Lambda. • Knowledge of front-end technologies including React, Angular, Javascript, HTML5, CSS and SASS. • Experience creating continuous integration and delivery pipelines. • Excellent verbal and written communication skills, leadership and drive to achieve.</Specialized_skills>

FIG. 16F  Finally extracted string for information-of-interest visually related to label "SPECIALIZED SKILLS" as it would be in output XML, with user-provided value "##NEWLINE##" to indicate original placement of line-breaks <Specialized_skills>Extensive experience working in an Agile/Scrum and certified scrum master. ##NEWLINE##• Profound knowledge of development of service-oriented applications and APIs. ##NEWLINE##• Strong experience developing scalable backend applications in Python using Flask and AWS Lambda. ##NEWLINE##• Knowledge of front-end technologies including React, Angular, Javascript, HTML5, CSS and SASS. ##NEWLINE##• Experience creating continuous integration and delivery pipelines. ##NEWLINE##• Excellent verbal and written communication skills, leadership and drive to achieve.</Specialized_skills>

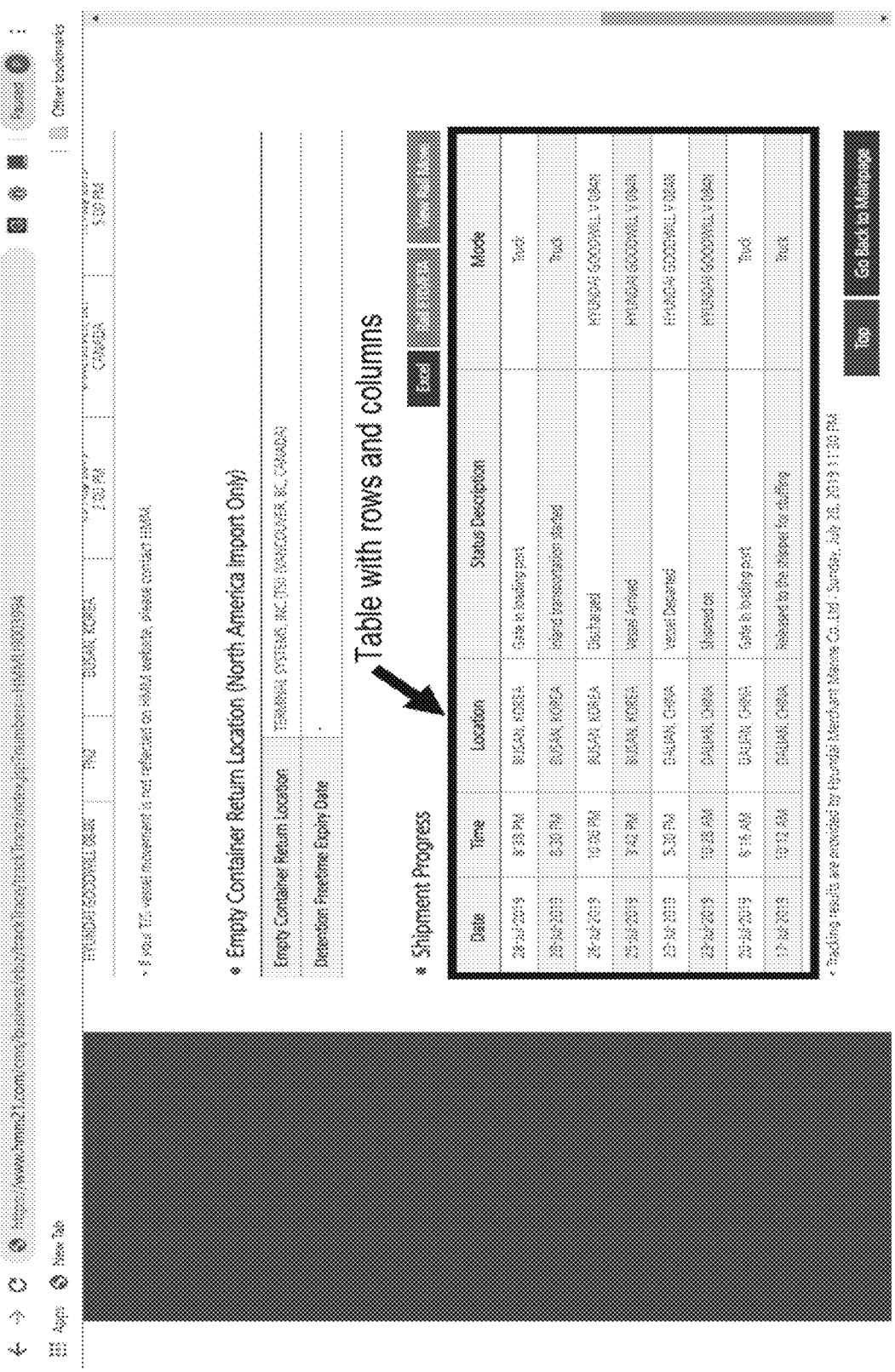
FIG. 17A  Example of Web page showing information as a table with rows and columns

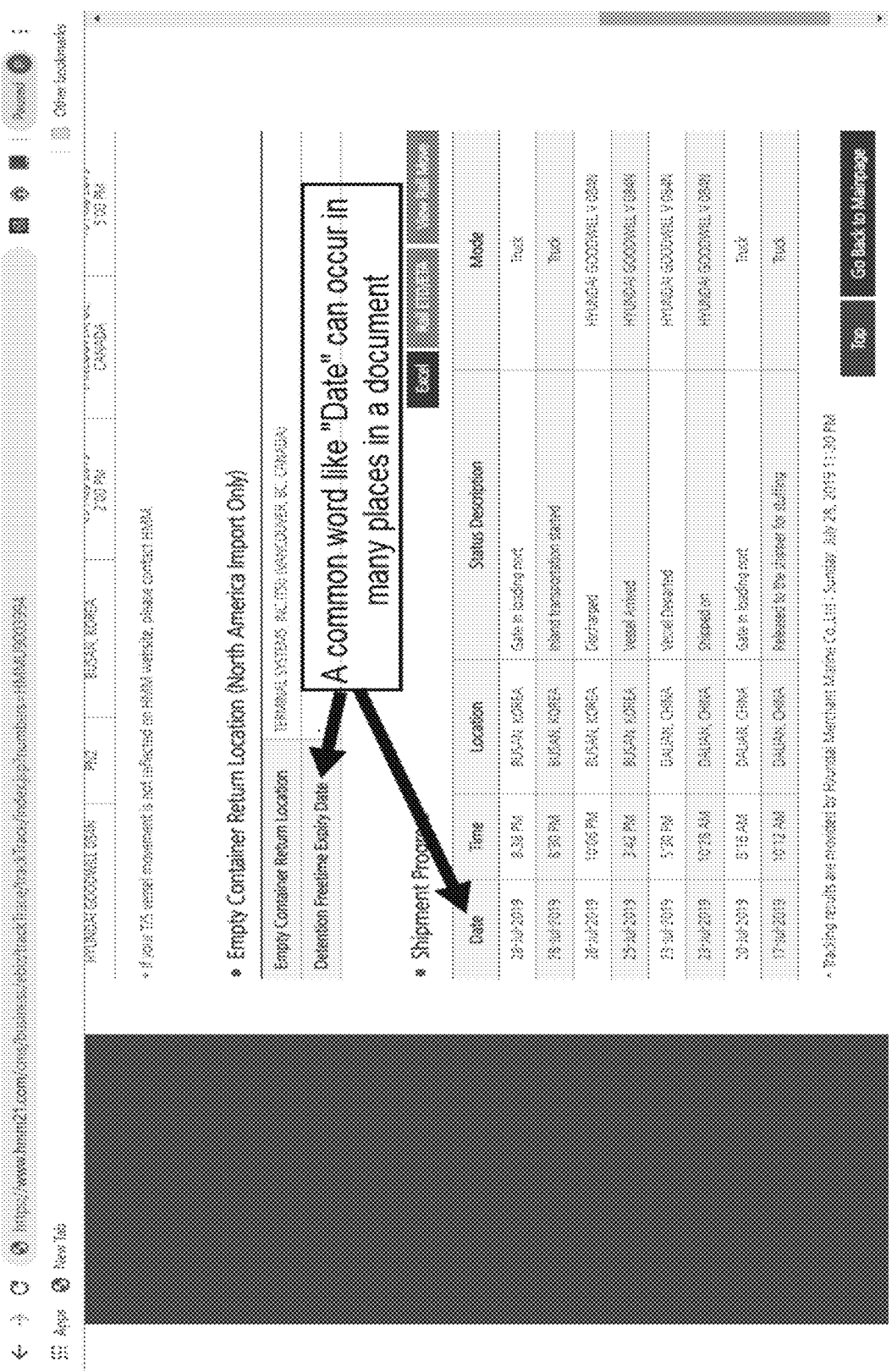
FIG. 17B  Common words like " Date" can appear multiple times in a source document FIG. 18   Example of user-provided labels for extracting unknown number of rows from a table

Labels for Information of Interest from Container Journey Tracking Web Pages

| Information_of_Interest | Information_is_Visually_Related_to_Label(s) | Searched in "Word Coordinates" in System memory, to |
|---|---|---|
| Journey_Event_Date | AllRelatedTo Shipment_Progress_Section_Identifier//Journey_Event_Date_Column_Header | Find the Date column header |
| Journey_Event_Time | AllRelatedTo Shipment_Progress_Section_Identifier//Journey_Event_Time_Column_Header | Find the Time column header |
| Journey_Event_Mode | AllRelatedTo Shipment_Progress_Section_Identifier//Journey_Event_Mode_Column_Header | Find the Mode column header |
| Journey_Event_Location | AllRelatedTo Shipment_Progress_Section_Identifier//Journey_Event_Location_Column_Header | Find the Location column header |
| Journey_Event_Status | AllRelatedTo Shipment_Progress_Section_Identifier//Journey_Event_Status_Column_Header | Find the Status column header |

| Label_Name | Label_Text_and_Synonyms | Searched in "Word Coordinates" in System memory, to |
|---|---|---|
| Document_Identifier | Shipment Progress | Confirm that current document is a Container Journey Tracking Docume |
| Shipment_Progress_Section_Identifier | Shipment Progress | Find the start of "Shipment Progress" section in document |
| Journey_Event_Date_Column_Header | Date\|Event date | Find the Date column header |
| Journey_Event_Time_Column_Header | Time\|Event Time | Find the Time column header |
| Journey_Event_Mode_Column_Header | Mode | Find the Mode column header |
| Journey_Event_Location_Column_Header | Location\|At | Find the Location column header |
| Journey_Event_Status_Column_Header | Status Description | Find the Status column header |

FIG. 19    Vertical gaps are used to add the next row, and to end table extraction
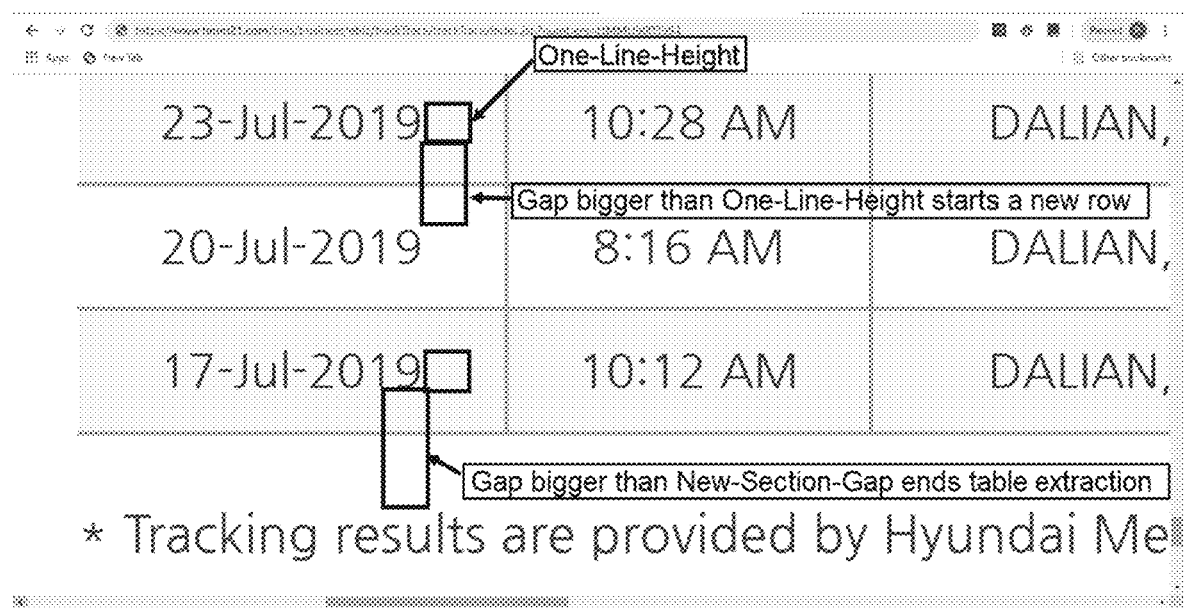

FIG. 20  XML for rows extracted from the "Shipping Progress" table from the Web page shown in FIG. 17A

```xml
<?xml version="1.0"?>
<One_File_Data>
 <Document Document_Type="Container Journey Tracking">
  <One_Data_Row>
    <Journey_Event_Date>28-Jul-2019</Journey_Event_Date>
    <Journey_Event_Time>8:39 PM</Journey_Event_Time>
    <Journey_Event_Mode>Truck</Journey_Event_Mode>
    <Journey_Event_Location>BUSAN, KOREA</Journey_Event_Location>
    <Journey_Event_Status>Gate In loading port</Journey_Event_Status>
    <SOURCE_FILE_NAME>https://www.hmm21.com/cms/business/ebiz/trackTrace/trackTrace/index.jsp?numbers=HMMU9003994</SOURCE_FILE_NAME>
    <PAGE_NUMBER>1.1</PAGE_NUMBER>
    <PAGE_EXTRACTION_NAME>Container Journey Tracking</PAGE_EXTRACTION_NAME>
    <PROCESSING_MESSAGES/>
    <PROCESSING_RESULTS>Successful</PROCESSING_RESULTS>
  </One_Data_Row>
  <One_Data_Row>
    <Journey_Event_Date>28-Jul-2019</Journey_Event_Date>
    <Journey_Event_Time>8:30 PM</Journey_Event_Time>
    <Journey_Event_Mode>Truck</Journey_Event_Mode>
    <Journey_Event_Location>BUSAN, KOREA</Journey_Event_Location>
    <Journey_Event_Status>Inland transportation started</Journey_Event_Status>
    <SOURCE_FILE_NAME>https://www.hmm21.com/cms/business/ebiz/trackTrace/trackTrace/index.jsp?numbers=HMMU9003994</SOURCE_FILE_NAME>
    <PAGE_NUMBER>1.1</PAGE_NUMBER>
    <PAGE_EXTRACTION_NAME>Container Journey Tracking</PAGE_EXTRACTION_NAME>
    <PROCESSING_MESSAGES/>
    <PROCESSING_RESULTS>Successful</PROCESSING_RESULTS>
  </One_Data_Row>
  <One_Data_Row>
    <Journey_Event_Date>26-Jul-2019</Journey_Event_Date>
```

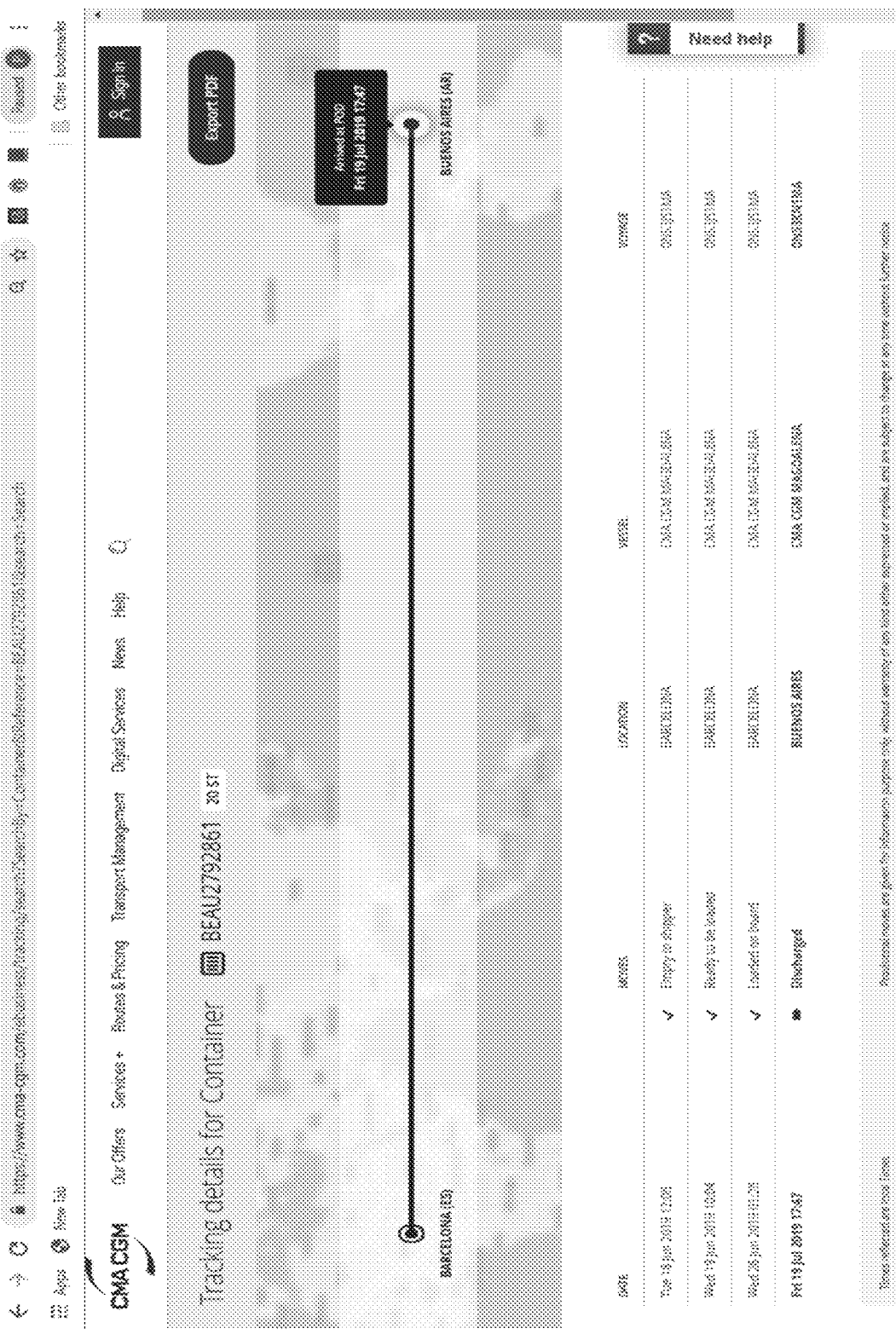
FIG. 21  Example of shipping container journey data on another Web site FIG. 22 Synonyms added to user-provided labels in the input Excel to handle multiple shipping container journey tracking Web sites

| | A | B | C |
|---|---|---|---|
| 1 | Labels for Information of Interest from Container Journey Tracking Web Pages | | |
| 2 | | | |
| 3 | Information_of_Interest | Information_is_Visually_Related_to_Label(s) | Searched in "Word Coordinates" in System memory, to |
| 4 | Journey_Event_Date | AllRelatedTo Shipment_Progress_Section_Identifier/Journey_Event_Date_Column_Header | Find the Date column header |
| 5 | Journey_Event_Time | AllRelatedTo Shipment_Progress_Section_Identifier/Journey_Event_Time_Column_Header | Find the Time column header |
| 6 | Journey_Event_Mode | AllRelatedTo Shipment_Progress_Section_Identifier/Journey_Event_Mode_Column_Header | Find the Mode column header |
| 7 | Journey_Event_Location | AllRelatedTo Shipment_Progress_Section_Identifier/Journey_Event_Location_Column_Header | Find the Location column header |
| 8 | Journey_Event_Status | AllRelatedTo Shipment_Progress_Section_Identifier/Journey_Event_Status_Column_Header | Find the Status column header |
| 9 | | | |
| 10 | | | |
| 11 | Label_Name | Label_Text_and_Synonyms | Searched in "Word Coordinates" in System memory, to |
| 12 | Document_Identifier | Shipment Progress \| Tracking details for Container | Confirm that current document is a Container Journey Tracking Document |
| 13 | Shipment_Progress_Section_Identifier | Shipment Progress \| Tracking details for Container | Find the start of "Shipment Progress" section in document |
| 14 | Journey_Event_Date_Column_Header | Date \| Event date | Find the Date column header |
| 15 | Journey_Event_Time_Column_Header | Time \| Event Time | Find the Time column header |
| 16 | Journey_Event_Mode_Column_Header | Mode \| Vessel | Find the Mode column header |
| 17 | Journey_Event_Location_Column_Header | Location \| At | Find the Location column header |
| 18 | Journey_Event_Status_Column_Header | Status Description \| Moves | Find the Status column header |

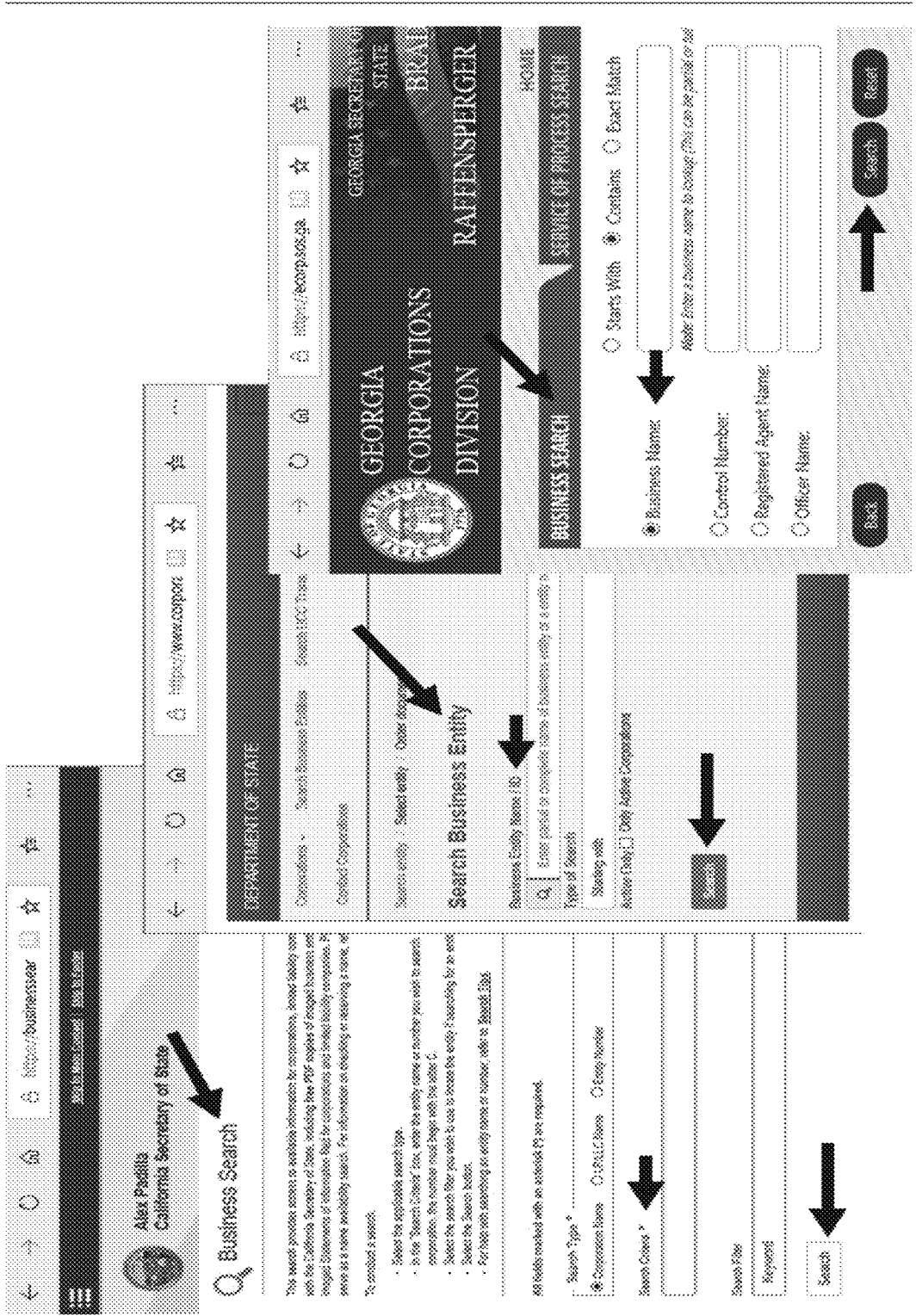
FIG. 23 Same "Business Search" functionality is built differently using different layouts on different Web pages FIG. 24 The System handles any "Business Search" Web page layout correctly by visually locating information-of-interest using labels and synonyms, including correct handling of unknown layouts

Labels for Information of Interest from Company Search Web Pages

| Information_of_Interest | Information_is_Visually_Related_to_Label(s) | Searched in "Word Coordinates" in System memory to |
|---|---|---|
| Search_Input_Box_on_Web_Page | RelatedTo Label_for_Search_Input_Box_on_Web_Page | Find the Search input box visually near label |
| Search_Button_on_Web_Page | RelatedTo Label_for_Search_Button_on_Web_Page | Find the Search button visually at label |

| Label_Name | Label_Text_and_Synonyms | Searched in "Word Coordinates" in System memory to |
|---|---|---|
| Document_Identifier | Business Search \| Search Business Entity | Confirm that current document is a Business Search Web Page |
| Search_Inputs_Section_Identifier | Business Search \| Search Business Entity | Find the start of "Search inputs" section in document |
| Label_for_Search_Input_Box_on_Web_Page | Search Criteria \| Business Entity Name / ID \| Business Name | Find the label visually directing a user to the search input box |
| Label_for_Search_Button_on_Web_Page | Search | Find the label visually directing a user to the search button |
| Other_Nearby_Labels | Search Filter \| Type of Search \| Control Number | To restrict the possibly locations of the search input box |

FIG. 25  Additional control parameters provided by user

| # | Control_Name | Control_Value |
|---|---|---|
| 1 | Additional Process Controls for Container Journey Tracking | |
| 2 | | |
| 3 | Control_Name | Control_Value |
| 4 | Input Documents Path | C:\Instaknow\Input Documents\ |
| 5 | Input Web Pages URLs | https://www.hmm21.com/ems/business/ebiz/track/track/trackIT rac/index.jsp?numbers=<ContainerNumber> |
| 6 | Path to move successfully processed documents | C:\Instaknow\Documents - Successful\ |
| 7 | Path to move irrelevant documents | C:\Instaknow\No Data of Interest Found in Document\ |
| 8 | Path to move documents requiring OCR | C:\Instaknow\Documents Requiring OCR\ |
| 9 | Allow partial label string matches | TRUE |
| 10 | Allow label upper/lower case variance | TRUE |
| 11 | Allow inexact matches above similarity | 95% |
| 12 | New line marker | ##NEWLINE## |
| 13 | Minimum number of dark pixels in checked checkbox or radio button | 40 |

FIG. 26   Examples of checkboxes visually related to line identifier and column header labels FIG. 27   Example of detecting an entire table with unknown headers, columns and rows

CAPITAL CALL TABLE
July 9, 2019

Investor 1, LLC

| Capital Call Uses | Total IX Community [1] | Hedge Fund IX, L.P. | Specific to L.P. |
|---|---|---|---|
| Capital Commitment | $5,070,645,420 | $3,597,100,878 | $242,500,000 |
| Management fees | $3,000,000 | $2,000,000 | $1,000,000 |
| Total capital call | $5,073,645,420 | $3,599,100,878 | $243,500,000 |
| Distribution of Investment Receipts | | | |
| Total distribution of investment receipts | ($8,184,336) | ($5,805,943) | ($391,410) |
| Total net amount due | | | $1,409,653 |

FIG. 28    Data extracted from an entire table with unknown headers, columns and rows

```xml
<?xml version="1.0"?>
<One_File_Data>
  <Document Document_Type="Capital Calls - All Tables by Typical Line">
    <All_Tables>
      <One_Table_Data>
        <Table_Title>CAPITAL CALL TABLE July 9, 2019</Table_Title>
        <Table_Body>
          <One_Data_Row Row_Name="Capital Commitment" Row_1st_Column_Indent="0" Row_Type="Detail">
            <Data_Row_Cells>
              <Cell Value="Capital Commitment" Column="Investor 1, LLC Capital Call Uses"/>
              <Cell Value="5870645420" Column="Total IX Community 1"/>
              <Cell Value="3597100878" Column="Hedge Fund IX, L.P."/>
              <Cell Value="242500000" Column="Specific to L.P."/>
            </Data_Row_Cells>
          </One_Data_Row>
          <One_Data_Row Row_Name="Management fees" Row_1st_Column_Indent="0" Row_Type="Detail">
            <Data_Row_Cells>
              <Cell Value="Management fees" Column="Investor 1, LLC Capital Call Uses"/>
              <Cell Value="3000000" Column="Total IX Community 1"/>
              <Cell Value="2000000" Column="Hedge Fund IX, L.P."/>
              <Cell Value="1000000" Column="Specific to L.P."/>
            </Data_Row_Cells>
          </One_Data_Row>
          <One_Data_Row Row_Name="Total capital call" Row_1st_Column_Indent="1" Row_Type="Detail">
            <Data_Row_Cells>
              <Cell Value="Total capital call" Column="Investor 1, LLC Capital Call Uses"/>
              <Cell Value="5873645420" Column="Total IX Community 1"/>
              <Cell Value="3599100878" Column="Hedge Fund IX, L.P."/>
              <Cell Value="243500000" Column="Specific to L.P."/>
            </Data_Row_Cells>
          </One_Data_Row>
          <One_Data_Row Row_Name="Distribution of Investment Receipts" Row_1st_Column_Indent="0" Row_Type="Section Header"> </One_Data_Row>
          <One_Data_Row Row_Name="Total distribution of investment receipts" Row_1st_Column_Indent="1" Row_Type="Detail">
            <Data_Row_Cells>
              <Cell Value="Total distribution of investment receipts" Column="Investor 1, LLC Capital Call Uses"/>
```

FIG. 29   Example of a legal contract showing logically related and unrelated clauses 14.13   The Vendor shall maintain the following insurance policies with companies rated at minimum A- by AM Best:

a. Commercial General Liability insurance, with a limit of USD 2 million per occurrence;

b. Automobile Liability insurance covering all owned, non-owned and hired automobiles, with USD 1 million combined single limit per accident;

c. Umbrella Liability insurance with a limit of USD 2 million per occurrence

FIG. 30   Example of the System's ability of detecting and ignoring intervening but irrelevant text like a human user would, to answer questions like "Does this contract have the expected clause of *'The Vendor shall obtain automobile liability insurance with limit of 2 million dollars per accident from a company rated at minimum A- by AM Best.'*?

14.13   The Vendor shall maintain the following insurance policies with companies rated at minimum A- by AM Best:

a. Commercial General Liability insurance, with a limit of USD 2 million per occurrence;

b. Automobile Liability insurance covering all owned, non-owned and hired automobiles, with USD 1 million combined single limit per accident;

c. Umbrella Liability insurance with a limit of USD 2 million per occurrence

Nearby intervening but irrelevant text is correctly ignored by the System

FIG. 31    Example of another legal contract showing logically related but placed at distance content (c)   Successor LIBOR. If the Administrative Agent determines that Required Lenders have determined, that:

(i)   adequate means do not exist for ascertaining LIBOR for any requested Interest Period, and such circumstances are unlikely to be temporary;

(ii)   the administrator of the LIBOR Screen Rate has made a public statement identifying a specific date after which LIBOR shall no longer be made available, then, the Administrative Agent and the Borrower may amend this Agreement to replace LIBOR with an alternate benchmark rate.

FIG. 32    System's ability of using alignment to detect continuation of parent paragraph text, correctly ignoring intervening text (c)   Successor LIBOR. If the Administrative Agent determines that Required Lenders have determined, that:

(i)   adequate means do not exist for ascertaining LIBOR for any requested Interest Period, and such circumstances are unlikely to be temporary;

(ii)   the administrator of the LIBOR Screen Rate has made a public statement identifying a specific date after which LIBOR shall no longer be made available, then, the Administrative Agent and the Borrower may amend this Agreement to replace LIBOR with an alternate benchmark rate.

FIG. 33  Physical deployment overview of System
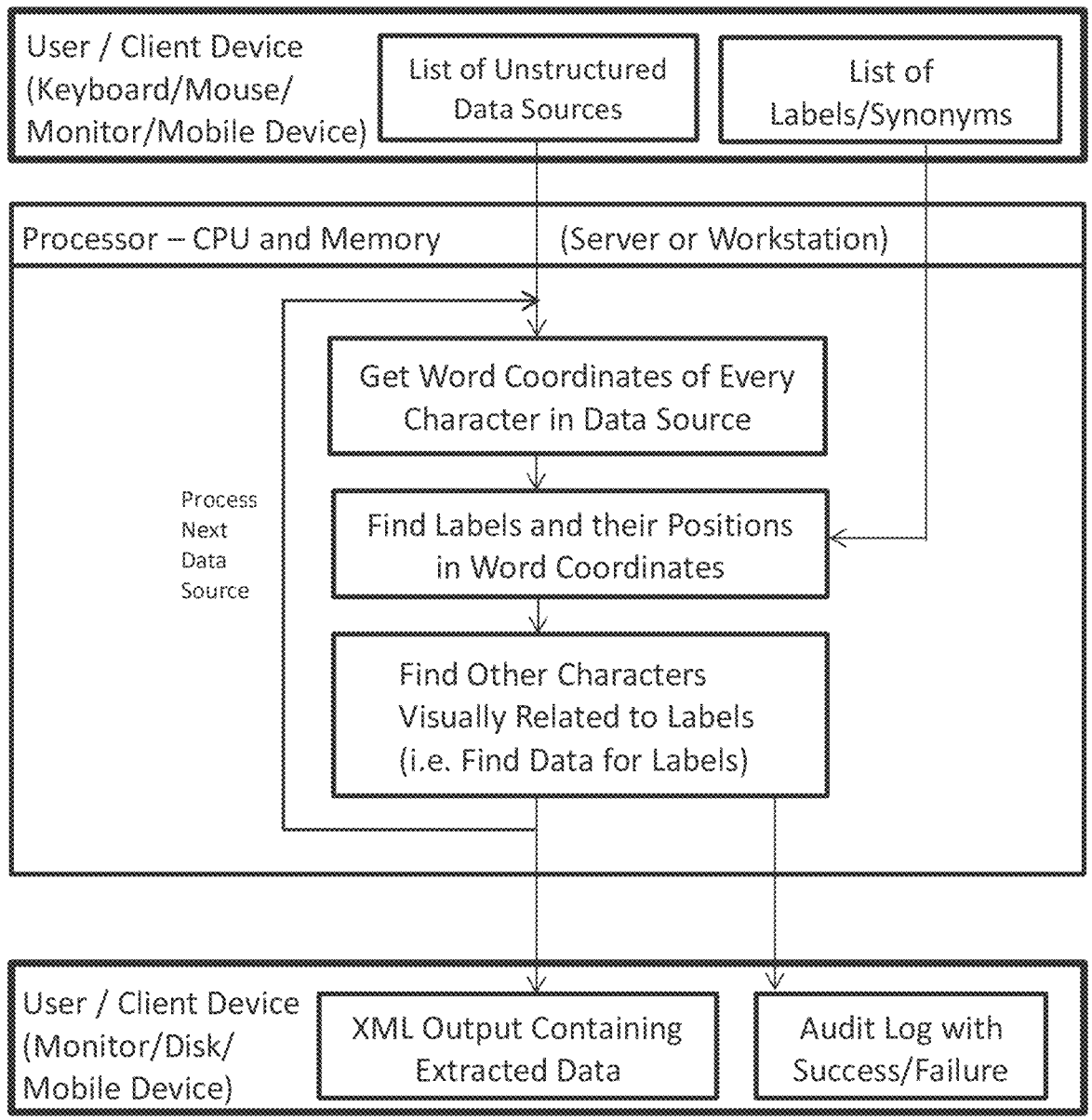

METHOD AND SYSTEM FOR HUMAN-VISION-LIKE SCANS OF UNSTRUCTURED TEXT DATA TO DETECT INFORMATION-OF-INTEREST

CROSS-REFERENCE TO RELATED APPLICATION

The instant application claims priority to U.S. Provisional Patent Application Ser. No. 62/883,387 filed Aug. 6, 2019, the entire specification of which is expressly incorporated herein by reference.

FIELD OF THE INVENTION

The present invention relates to the field of artificial intelligence technology in scanning and analyzing complex unstructured text data, and more specifically, utilizing multiple electronic scans of the text data and use of electronic calculations to emulate human vision to detect, isolate and extract information-of-interest despite unknown text data layouts.

BACKGROUND OF THE INVENTION

Since the 1980s, rapid hardware and software advances have made it possible to process massive amounts of data. However, these advances work well only when processing "well-described" or "well-structured" data.

However, vast amounts of text data are "unstructured," i.e., they have unknown data layouts. For example, emails, social media posts, blogs, Web pages showing Web search results, Web pages showing stock market information, financial report PDFs, scientific research paper PDFs, medical test results and so forth, have their contents sequenced and positioned randomly as desired by their author/publisher, without any standardized layout. These unstructured text data sources, i.e., practically all Web pages and documents meant for viewing by individuals, contain valuable information, but they require a person to manually view the data source to search and visually isolate the desired information to benefit from it.

For purposes of discussion, the terms "unstructured text data," "unstructured data" and "unknown-layout data" as used herein, will have the same meaning and be used interchangeably.

For purposes of discussion, the term "word," will include any text, word, term, expression, name, phrase, symbol, figure, character, mark, numeric sequence, alphanumeric sequence, and/or the like.

Conventional computers designed for structured text data processing (i.e., processing of data defined precisely by other metadata, for example, Extensible Markup Language (hereinafter referred to as "XML"), JavaScript Object Notation (hereinafter referred to as "JSON"), Electronic data interchange (hereinafter referred to as "EDI") and relational databases) may not handle the unknown data layouts of unstructured data because these layouts lack predictable and reliable locations, sequences, technical descriptors and/or metadata. Current software advances like machine learning (hereinafter referred to as "ML") and robotic process automation (hereinafter referred to as "RPA") may be taught examples of specific unstructured text data layouts, such as layouts of specific Web sites and specific document layouts containing information-of-interest at predictable locations, or standardized data sequences, or reliable technical descriptors within the data source (for example, fixed HTML tag ids, names or paths, or a cell at a known row-column intersection in an EXCEL worksheet). These examples are then used as "templates" for future automatic processing of these specific expected data layouts. However, any unexpected variation in the unstructured data that does not match a previously defined example template results in an error.

These ML and RPA tools lack the ability of dynamically finding and extracting information-of-interest from unknown-layout data sources. As an example, these tools are incapable of extracting, for example, "Capital Assets" for "Fiscal Year 2018" from multiple balance sheet financial statement PDFs (for example, as shown in FIG. 1), because every balance sheet document may have unknown number of pages, unknown start and end of the "Assets" section within the document (there may or may not be fax cover sheets, auditor opinion pages before the "Assets" section starts in the document), unknown number of detailed accounting ledger lines on every page and unknown number of financial years shown as columns on every page, with "Fiscal Year 2018" potentially being in any of the columns. The actual location of "Capital Assets" for "Fiscal Year 2018" in a future balance sheet document is thus impossible to predict, making the "pre-taught examples" approach completely useless. It should be noted that the location on the example page for "ABC Inc.—Fiscal Year 2018, Capital Assets" amount of $3,000 does not match the location on the other example page for "XYZ Inc.—FY 2018, Assets-Capital" amount of $5,000.

While it is possible to extract raw text data out of these unknown format documents using standard programming techniques, with the hope of parsing this raw text to precisely find the information-of-interest, many times the extracted raw data is completely out of order, making parsing impossible (for example, see FIG. 2 for an example of a PDF file whose raw text data has been extracted out of order).

These current unstructured data isolation and extraction computing capability gaps in ML and RPA are not a computing speed or processing power issue, but rather an approach and design limitation.

Many companies throughout the world continue significant efforts to improve processing of unstructured text data, but all of them rely on some form of ML, requiring time-consuming "system training" steps using examples/templates. They still have the flaw that any unexpected text layout variation that falls outside the set of prior-known examples will cause an error. Currently, no commercial software claims to use human-vision-like scanning of unknown-layout text data to detect, isolate and extract information-of-interest, without needing prior examples.

Considering that unstructured data is growing, and will grow much faster than structured data, there exists a need for an automated electronic mechanism that may search for, detect, isolate, extract and update information-of-interest from unknown layout data sources is and will be highly useful in avoiding slow, error-prone, expensive manual steps required today to benefit from the information contained in the unstructured text data sources.

SUMMARY OF THE INVENTION

The present invention provides methods, systems and computer software programs that have the human-vision-like, but electronic ability of automatically searching, isolating and extracting information-of-interest from single or multi-page, unknown layout, unstructured text data sources. By information-of-interest, as that term is used herein, it is meant to include any information that a user of the methods, systems and computer software programs of the present invention would consider to be of interest for any purpose.

By way of a non-limiting example, the present invention uses multiple scans of each unstructured data source to locate, for example, user-provided document identifiers, page identifiers, section headers, labels, column headers and row descriptors. It then uses horizontal/vertical alignments, fonts/colors, punctuation, gaps between words, gaps between lines, language convention (for example, most language scripts write from left-to-right, but some language scripts write from right-to-left, for example, Arabic, Hebrew, Persian, and Urdu) to determine the type of document, start and end of relevant sections/paragraphs and uses actually-found locations of labels to accurately calculate location of information-of-interest within these unknown layout text documents.

The present invention may be used in thousands of different ways in many industries and problem-solving areas.

By way of a non-limiting example, the system receives two main inputs from a user, client device or another program:

a first list of unknown-layout text data sources, such as URLs of Web pages, or locations of WORD, POWER-POINT, EXCEL, PDF and other commonly used documents on disk drives accessible to the system; and a second list of information-of-interest to be detected, isolated and extracted from the unstructured data sources. Labels and synonyms of labels identifying information-of-interest may also be provided, if needed.

The system processes the input list of unstructured text data sources using the list of labels, and returns the following to the user, client device or calling program:

an XML output containing all detected, isolated and extracted information-of-interest as defined by the user-provided list of labels;

an audit log file stating success/failure of the data extraction; and the XML output may be fed to conventional computer systems for further automated processing (for example, see FIG. 3 for an overview of the present invention).

In accordance with a first embodiment of the present invention, a method for automatically searching, isolating and extracting information-of-interest from single or multi-page, unknown layout, unstructured text data sources is provided, comprising the steps of:

providing a first computer processing system, comprising:
a computer processor unit; and
a non-transitory computer readable medium operably associated with the computer processor unit, the non-transitory computer readable medium storing instructions executable by the computer processor unit to perform the steps of:

inputting a first list of the single or multi-page, unknown layout, unstructured text data sources;

inputting a second list of information-of-interest to be detected, isolated and extracted from the single or multi-page, unknown layout, unstructured text data sources, wherein the second list includes a list of labels;

processing the first list of single or multi-page, unknown layout, unstructured text data sources using the list of labels;

outputting a report containing all detected, isolated and extracted information-of-interest as defined by the list of labels;

optionally, outputting an audit log file stating success or failure of the data extraction; and optionally, feeding the report to a second computer processing system for further processing.

In accordance with an aspect of this embodiment, the processing step includes:

determining and storing a user visible pixel location of each word in the single or multi-page, unknown layout, unstructured text data sources in a memory of the first computer processing system, wherein the determining step includes using a pixel left-right axis and a pixel up-down axis as a word coordinate point to establish the pixel location of each word.

In accordance with an aspect of this embodiment, the method further comprises the steps of:

sorting the word coordinate points first by page number, within that by an up-down axis value so as to arrange all words in one line together and arrange the lines on one page from top-to-down, and within that by the left-right axis value of each word so as to arrange all words in one line from left-to-right in the of the memory of the first computer processing system; and creating an electronic replica of an actual data layout that would be seen by a user in the memory of the first computer processing system.

In accordance with an aspect of this embodiment, the method further comprises the step of:

locating words visually in the same horizontal line as any other words having at least a partially overlapping left-right axis value.

In accordance with an aspect of this embodiment, the method further comprises the step of:

locating words visually in the same vertical column as any other words having at least a partially overlapping up-down axis value.

In accordance with an aspect of this embodiment, the method further comprises the step of:

calculating a width of horizontal gaps between words in the same horizontal line.

In accordance with an aspect of this embodiment, the method further comprises the step of:

calculating a height of vertical gaps between words in adjacent lines.

In accordance with an aspect of this embodiment, the method further comprises the step of:

calculating a distance between words to see which words are visually adjacent each other horizontally.

In accordance with an aspect of this embodiment, the method further comprises the step of:

calculating a distance between words to see which words are visually adjacent each other vertically.

In accordance with an aspect of this embodiment, the single or multi-page, unknown layout, unstructured text data sources include an unknown number of pages.

In accordance with an aspect of this embodiment, the single or multi-page, unknown layout, unstructured text data sources include an unknown sequence of pages.

In accordance with an aspect of this embodiment, the processing step further comprises searching, isolating and ignoring intervening page headers and footers to extract contiguous information-of-interest from consecutive pages of the single or multi-page, unknown layout, unstructured text data sources.

In accordance with an aspect of this embodiment, the processing step further comprises searching, isolating and extracting an unknown number, lengths and indentations of sections or paragraphs from the single or multi-page, unknown layout, unstructured text data sources.

In accordance with an aspect of this embodiment, the processing step further comprises searching, isolating and extracting information-of-interest from tabular data with an unknown number of rows and column sequences from the single or multi-page, unknown layout, unstructured text data sources.

In accordance with an aspect of this embodiment, the processing step further comprises searching, isolating and extracting information-of-interest from multiple text paragraphs of the single or multi-page, unknown layout, unstructured text data sources, with the capability to detect and ignore intervening information that is not of interest to a user.

In accordance with a second embodiment of the present invention, a method for automatically searching, isolating and extracting information-of-interest from single or multi-page, unknown layout, unstructured text data sources is provided, comprising the steps of:

providing a first computer processing system, comprising:
a computer processor unit; and
a non-transitory computer readable medium operably associated with the computer processor unit, the non-transitory computer readable medium storing instructions executable by the computer processor unit to perform the steps of:
inputting a first list of the single or multi-page, unknown layout, unstructured text data sources;
inputting a second list of information-of-interest to be detected, isolated and extracted from the single or multi-page, unknown layout, unstructured text data sources, wherein the second list includes a list of labels;
processing the first list of single or multi-page, unknown layout, unstructured text data sources using the list of labels;
wherein the processing step includes:
determining and storing a user visible pixel location of each word in the single or multi-page, unknown layout, unstructured text data sources in a memory of the first computer processing system, wherein the determining step includes using a pixel left-right axis and a pixel up-down axis as a word coordinate point to establish the pixel location of each word;
outputting a report containing all detected, isolated and extracted information-of-interest as defined by the list of labels;
optionally, outputting an audit log file stating success or failure of the data extraction; and
optionally, feeding the report to a second computer processing system for further processing.

In accordance with an aspect of this embodiment, the method further comprises the steps of:
sorting the word coordinate points first by page number, within that by an up-down axis value so as to arrange all words in one line together and arrange the lines on one page from top-to-down, and within that by the left-right axis value of each word so as to arrange all words in one line from left-to-right in the of the memory of the first computer processing system; and
creating an electronic replica of an actual data layout that would be seen by a user in the memory of the first computer processing system.

In accordance with an aspect of this embodiment, the method further comprises the step of:
locating words visually in the same horizontal line as any other words having at least a partially overlapping left-right axis value.

In accordance with an aspect of this embodiment, the method further comprises the step of:
locating words visually in the same vertical column as any other words having at least a partially overlapping up-down axis value.

In accordance with an aspect of this embodiment, the method further comprises the step of:
calculating a width of horizontal gaps between words in the same horizontal line.

In accordance with an aspect of this embodiment, the method further comprises the step of:
calculating a height of vertical gaps between words in adjacent lines.

In accordance with an aspect of this embodiment, the method further comprises the step of:
calculating a distance between words to see which words are visually adjacent each other horizontally.

In accordance with an aspect of this embodiment, the method further comprises the step of:
calculating a distance between words to see which words are visually adjacent each other vertically.

In accordance with a third embodiment of the present invention, a method for automatically searching, isolating and extracting information-of-interest from single or multi-page, unknown layout, unstructured text data sources is provided, comprising the steps of:
providing a parallel computer processing system operable to simultaneously perform the searching, isolating and extracting of the information-of-interest from the text data sources, wherein each computer processing system of the parallel computer processing system comprises:
a computer processor unit; and
a non-transitory computer readable medium operably associated with the computer processor unit, the non-transitory computer readable medium storing instructions executable by the computer processor unit to perform the steps of:
inputting a first list of the single or multi-page, unknown layout, unstructured text data sources;
inputting a second list of information-of-interest to be detected, isolated and extracted from the single or multi-page, unknown layout, unstructured text data sources, wherein the second list includes a list of labels;
processing the first list of single or multi-page, unknown layout, unstructured text data sources using the list of labels;
outputting a report containing all detected, isolated and extracted information-of-interest as defined by the list of labels;
optionally, outputting an audit log file stating success or failure of the data extraction; and
optionally, feeding the report to another computer processing system for further processing.

In accordance with an aspect of this embodiment, the processing step includes:
determining and storing a user visible pixel location of each word in the single or multi-page, unknown layout, unstructured text data sources in a memory of the parallel computer processing system, wherein the determining step includes using a pixel left-right axis and a pixel up-down axis as a word coordinate point to establish the pixel location of each word.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Figure 1:
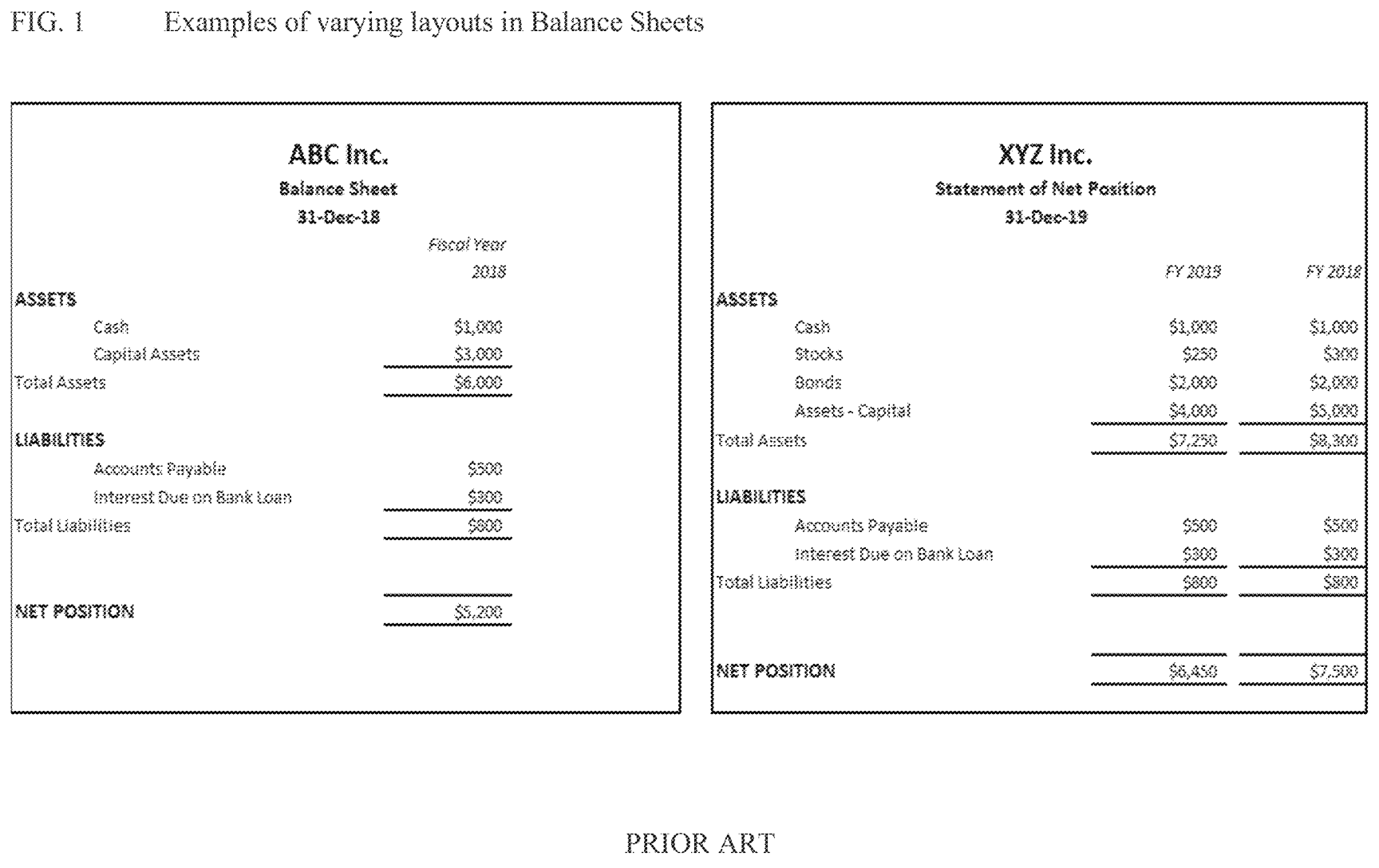

FIG. 1 illustrates a schematic of several examples of varying layouts in balance sheets, in accordance with the prior art.

FIG. 2 illustrates a screenshot of an example of a PDF file whose extracted raw text is out of order, in accordance with the prior art.

FIG. 3 illustrates a schematic overview of a system for automatically searching, isolating and extracting information-of-interest from single or multi-page, unknown layout, unstructured text data sources, in accordance with the general teachings of the present invention.

FIG. 4 illustrates a screenshot of an example of user-provided labels, their synonyms, and listing of information-of-interest, in accordance with the general teachings of the present invention.

FIG. 5 illustrates a screenshot of an example of (X, Y) coordinates of the left edge of a word, in accordance with the general teachings of the present invention.

FIG. 6 illustrates a screenshot of an example of X, Y coordinates of words, in accordance with the general teachings of the present invention.

FIG. 7 illustrates a schematic of an example of an effect of detecting and deleting page footers and headers, in accordance with the general teachings of the present invention.

FIG. 8 illustrates a schematic of an example of original pages stitched together in one long page, in accordance with the general teachings of the present invention.

FIG. 9 illustrates a screenshot of an example of word coordinates for words visually below "Fiscal Year 2018," in accordance with the general teachings of the present invention.

FIG. 10 illustrates a schematic of the system's emulation of human-vision-like intersection of user-provided labels "Fiscal_Year_Column_Identifier" and "Capital_Assets_Line_Identifier" isolates the correct amount despite layout variances, in accordance with the general teachings of the present invention.

FIG. 11 illustrates a schematic of an example of a document signature section having data above labels, in accordance with the general teachings of the present invention.

FIG. 12 illustrates a schematic of an example of XML from "ABC Inc." balance sheet, in accordance with the general teachings of the present invention.

FIG. 13 illustrates a screenshot of an example of XML with data extracted from a tax return, in accordance with the general teachings of the present invention.

FIG. 14A illustrates a schematic of an example of data layout in a shipping document, showing data below labels, in accordance with the general teachings of the present invention.

FIG. 14B illustrates a schematic of an example of a "Large horizontal gap" in a shipping document, i.e., a gap of more than one-space-width, in accordance with the general teachings of the present invention.

FIG. 14C illustrates a schematic of an example of a "Large vertical gap" in a shipping document, i.e., a gap of more than one-line-height, in accordance with the general teachings of the present invention.

FIG. 14D illustrates a schematic of an example of an area containing words to the right and below the label "BILL OF LADING NO." in a shipping document, in accordance with the general teachings of the present invention.

FIG. 14E illustrates a schematic of an example wherein only the correct word is isolated after excluding words separated by large horizontal and vertical gaps in a shipping document, in accordance with the general teachings of the present invention.

FIG. 14F illustrates a schematic of an example wherein words that are visually contiguous are correctly included for the label "VESSEL NAME" in a shipping document, in accordance with the general teachings of the present invention.

FIG. 15A illustrates a schematic of an example of data layout in a shipping document, showing data to the right of the label, in accordance with the general teachings of the present invention.

FIG. 15B illustrates a schematic of an example of an inclusion-area of a label "BILL OF LADING NO." in a shipping document, in accordance with the general teachings of the present invention.

FIG. 15C illustrates a schematic of an example of the nearby label "SHIPPER REFERENCE:" in a shipping document that correctly narrows down the words in the inclusion-area of the label "BILL OF LADING NO.," in accordance with the general teachings of the present invention.

FIG. 16A illustrates a screenshot of a "SPECIALIZED SKILLS" section from a resume, in accordance with the general teachings of the present invention.

FIG. 16B illustrates a screenshot of an inclusion-area for the label "Specialized Skills," in accordance with the general teachings of the present invention.

FIG. 16C illustrates a schematic of an example of words originally isolated from the inclusion-area of the label 'SPECIALIZED SKILLS," in accordance with the general teachings of the present invention.

FIG. 16D illustrates a schematic of an example of words isolated after scanning to the left of each line and adding contiguous words, in accordance with the general teachings of the present invention.

FIG. 16E illustrates a schematic of an example of a finally extracted string for information-of-interest visually related to the label "SPECIALIZED SKILLS" as it would be in an output XML, in accordance with the general teachings of the present invention.

FIG. 16F illustrates a schematic of an example of a finally extracted string for information-of-interest visually related to the label "SPECIALIZED SKILLS" as it would be in an output XML, with user-provided value "##NEWLINE ##" to indicate the original placement of line-breaks, in accordance with the general teachings of the present invention.

FIG. 17A illustrates a screenshot of an example of a Web page showing information as a table with rows and columns, in accordance with the general teachings of the present invention.

FIG. 17B illustrates a screenshot of an example of a Web page showing common words like "date" may appear multiple times in a source document, in accordance with the general teachings of the present invention.

FIG. 18 illustrates a screenshot of an example of user-provided labels for extracting an unknown number of rows from a table, in accordance with the general teachings of the present invention.

FIG. 19 illustrates a schematic of an example of vertical gaps that are used to add the next row, and to end table extraction, in accordance with the general teachings of the present invention.

FIG. 20 illustrates a schematic of an example of XML for rows extracted from the "Shipping Progress" table from the Web page depicted in FIG. 17A, in accordance with the general teachings of the present invention.

FIG. 21 illustrates a screenshot of an example of a Web page showing an example of shipping container journey data on another Web site, in accordance with the general teachings of the present invention.

FIG. 22 illustrates a schematic of an example of synonyms added to user-provided labels in the input EXCEL worksheet to handle multiple shipping container journey tracking Web sites, in accordance with the general teachings of the present invention.

FIG. 23 illustrates a schematic of examples of the same "business search" functionality that is built differently using different layouts on different Web pages, in accordance with the general teachings of the present invention.

FIG. 24 illustrates a schematic of an example of the system handling any "business search" Web page layout correctly by visually locating information-of-interest using labels and synonyms, including correct handling of unknown layouts, in accordance with the general teachings of the present invention.

FIG. 25 illustrates a schematic of an example of additional control parameters provided by the user, in accordance with the general teachings of the present invention.

Figure 26:
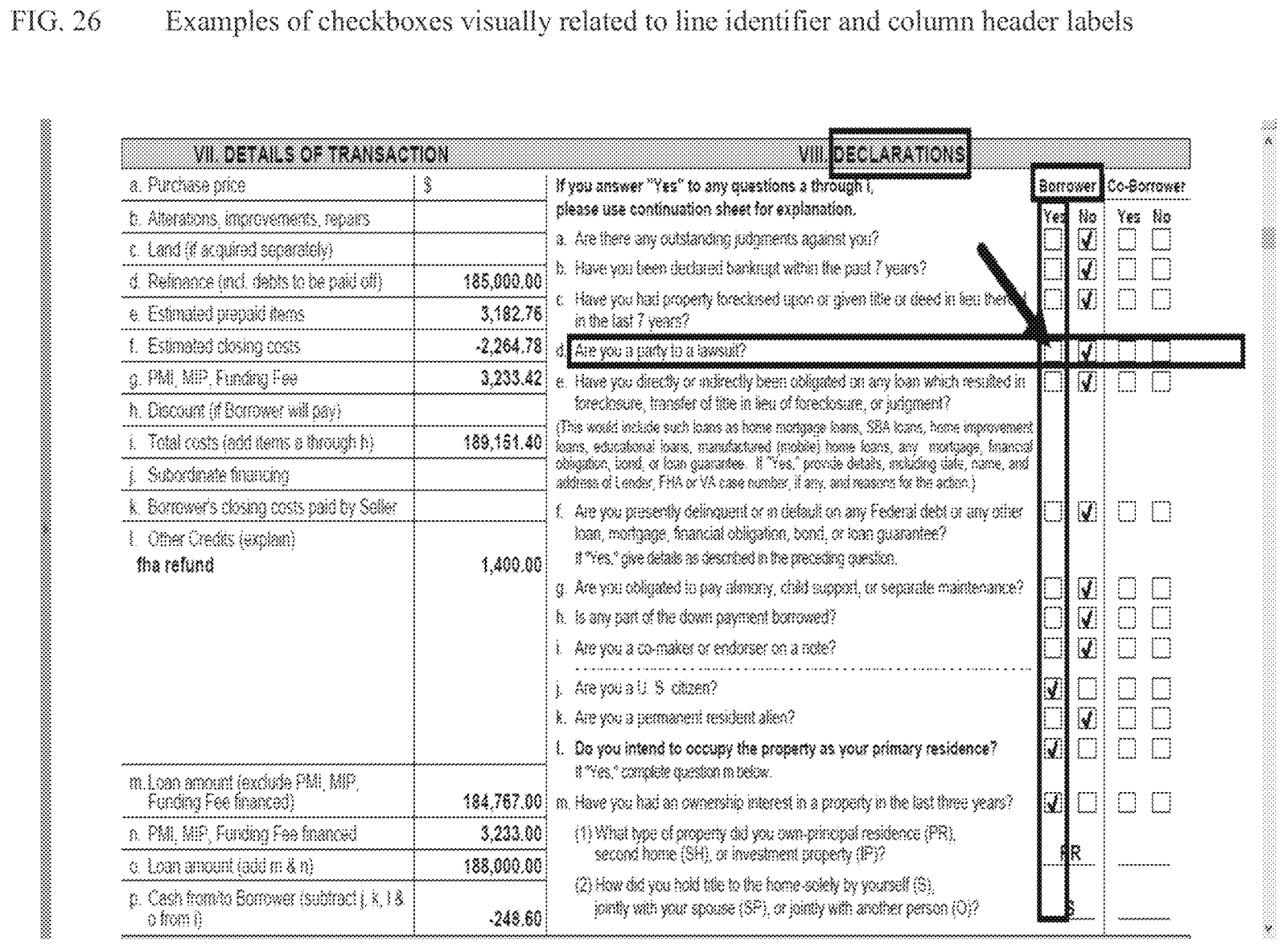

FIG. 26 illustrates a schematic of examples of checkboxes visually related to the line identifier and column header labels, in accordance with the general teachings of the present invention.

FIG. 27 illustrates a schematic of an example of detecting an entire table with unknown headers, columns and rows, in accordance with the general teachings of the present invention.

FIG. 28 illustrates a schematic of an example of data extracted from an entire table with unknown headers, columns and rows, in accordance with the general teachings of the present invention.

FIG. 29 illustrates a schematic of an example of a legal contract showing logically related and unrelated clauses, in accordance with the general teachings of the present invention.

FIG. 30 illustrates a schematic of an example of the system's ability of detecting and ignoring intervening, but irrelevant, text like a human user would, to answer questions like "Does this contract have the expected clause of 'The Vendor shall obtain automobile liability insurance with limit of 2 million dollars per accident from a company rated at minimum A– by AM Best.'?, in accordance with the general teachings of the present invention.

FIG. 31 illustrates a schematic of an example of another legal contract showing logically related, but placed at distance, content, in accordance with the general teachings of the present invention.

FIG. 32 illustrates a schematic of an example of the system's ability for using alignment to detect continuation of parent paragraph text while correctly ignoring intervening text, in accordance with the general teachings of the present invention.

FIG. 33 illustrates an alternative schematic overview of a system for automatically searching, isolating and extracting information-of-interest from single or multi-page, unknown layout, unstructured text data sources, in accordance with the general teachings of the present invention.

DETAILED DESCRIPTION OF THE INVENTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

With reference to FIGS. 3-33 generally, and with specific reference to FIG. 3, the system of the present invention is capable of loading text from an unstructured text data source like a Web page, or a WORD, POWERPOINT, EXCEL, and/or PDF document, from a user-provided list of such data sources, and storing the contents of the data source in computer memory. This is achieved using well-known, publicly available programming protocols/application programming interfaces (hereinafter referred to as "APIs") provided by MICROSOFT, ADOBE, as well as other software providers. For example, MICROSOFT System.Windows.Form, MICROSOFT System.Drawing, MICROSOFT EXCEL.Workbooks, MICROSOFT WORD.Document, PDFparserLib.DLL and so forth.

The system is also capable of reading a user-provided list of information-of-interest, the labels that a person would use to identify each information-of-interest item in the document text, and the label-information relationship for each item.

For example, with specific reference to FIG. 4, the system reads and stores in memory the labels "Balance Sheet," "Capital Assets" and "Fiscal year 2018." The user may supply this label list in a user-friendly mechanism like an EXCEL worksheet and provide the path of this EXCEL worksheet to the system as processing inputs. The user may also provide synonyms of the labels, i.e., variations of words that have the same business meaning in the user's industry. For example, a "Balance Sheet" may also be called "Statement of Net Positions" or "Statement of Net Assets." "Capital Assets" may also be referred to as "Assets-Capital," and "Fiscal Year 2018" may also be referred to as "FY 2018." For example, see the second section in the EXCEL example shown in FIG. 4 for an example of user-provided list of labels and label synonyms, which starts in EXCEL worksheet row 9.

In the same EXCEL worksheet, the user also provides a list of the information-of-interest, and for every item, its label-information relationship. For example, the amount "Capital Assets for Fiscal Year 2018" is always visually below the column "Fiscal Year 2018" and to the right of the line label "Capital Assets," so these two labels together point to the actual location of that amount, despite location variances across different balance sheets. For example, see the first section in the EXCEL worksheet example shown in FIG. 4 for an example of user-provided list of information-of-interest, which starts in EXCEL worksheet row 4. In that row, the user has provided "Below_Fiscal_Year_Column_Identifier and Right of Capital_Assets_Line_Identifier" in the "Information_is_Visually_Related_to_Label(s)" column of this section.

While the following discussion describes the system processing steps for one document, other user-specified documents may be processed in a similar manner using a programmed loop.

The system then electronically discovers and stores the user-visible/viewable pixel location of each text word in the user-provided data source in the computer memory, using a pixel left-right axis (i.e., X-axis) and a pixel up-down axis (i.e., Y-axis) as a reference. The publicly available programming protocols/APIs from MICROSOFT, ADOBE and other software tool companies, mentioned above, provide this pixel-level word-location information for text data presented in Web pages loaded in browsers, or data kept in EXCEL worksheets, and data in pages of WORD, POWERPOINT and PDFs files. The APIs also provide the page number of every word and the word's font details, for example, font name, size, style (for example, bold, italic and so forth), stroke-color (i.e., color of characters) and the fill-color (i.e., background-color). For ease of reference, this word-pixel-location memory storage will be referred to as "word coordinates." The innovation in the system lies, at least in part, in using the word coordinates to emulate human vision.

It should be noted that the word pixel location discovery using APIs is done using standard programming techniques that may be coded in any programming language. The actual Web page, or EXCEL Worksheet, or WORD or POWERPOINT or PDF document does not need to be visibly opened on the computer running the system. The MICROSOFT and ADOBE provided programming protocols/APIs may read the data in Web pages and documents "silently," without loading them in a visible/viewable Graphical User Interface. Word coordinates are a common programming memory area called an "array," that holds multiple rows and multiple columns in each row. Most modern programming languages provide built-in capabilities to read, scan, search and update data in an array.

The system then sorts the word coordinates first by page number (i.e., put all words from one page together), within that by the up-down Y-axis value (i.e., arrange all words in one line together and arrange the lines on one page from top-to-down), and within that by the left-right X-axis value of each word (i.e., arrange all words in one line from left-to-right in the memory, as they would be in a user-visible/viewable browser or document view), and creating an electronic replica in the computer memory of the actual data layout that would be seen by a person's eye. For ease of reference, this electronic visual replica in computer memory will be referred to as an "electronic view."

The top left corner of the Web page and EXCEL worksheet, and the top left corner of the first page of a WORD, POWERPOINT or PDF document is conventionally considered as the "origin," i.e., "0" X-coordinate and "0" Y-coordinate for ease of mathematical calculations. So, all words in the Web page, EXCEL worksheet, or all words in the WORD/POWERPOINT/PDF document pages are below and to the right of this (0 X, 0 Y) origin reference point.

For example, see FIG. 5 for an example of the word "ASSETS" in a balance sheet PDF file. The word left edge is at a pixel location having an X-coordinate value of 104.5, and the word bottom edge is at pixel location having a Y-coordinate value of 270.6. For example, see FIG. 6 for an example of the word coordinates memory area for the same page of the PDF.

By way of a non-limiting example, each word occupies the space in the electronic view as specified by its horizontal span given by its X_Bottom_Left and X_Bottom_Right coordinate values, and its vertical span given by its Y_Bottom_Left and Y_Top_Left coordinate values in the word coordinates. Effectively, each word occupies a rectangular "box" in the electronic view. The four corners of the word box are defined by X_Bottom_Left, X_Bottom_Right, Y_Bottom_Left and Y_Top_Left of the word.

Using the common origin reference point (0, 0) on the top-left of the first page, the system may scan word coordinates in computer memory to:

Determine the user-perceived visual location of every word in the word coordinates computer memory area and in the electronic view memory area;

Find words visually in the same horizontal line as any other reference word (i.e., words having the same Y_Bottom_Left value as the reference word; or words having a complete or partial overlap of their two Y-coordinate values with the two Y-coordinates of the reference word). This ability is used to find words in one line that match user-provided labels, for example, "Balance Sheet;"

Find words visually in the same vertical column as any other reference word (i.e., words having a complete or partial overlap of their two X-coordinate values with the two X-coordinate values of the reference word). This ability is used to find words that are vertically wrapped in adjacent lines and are directly below each other, for example, the wrapped column header label "Fiscal year <Linebreak>2018" shown for 'ABC Inc." in FIG. 1.

Calculate the width of horizontal gaps between words in the same line (i.e., the difference between X_Bottom_Right of the first word and X_Bottom_Left of the second word to the right of the first word);

Calculate the height of vertical gaps between words in neighboring lines (i.e., the difference between Y_Bottom_Left of the first word and the Y_Top_Left of the second word below the first word);

Calculate the distance between words to see which words are visually adjacent/near each other horizontally (i.e., words having a complete or partial overlap of their Y-coordinate value—words visually in the same line—and a small difference in the X_Bottom_Right value of the first word and the X_Bottom_Left value of the second word to the right of the first word);

Calculate the distance between words to see which words are visually adjacent/near each other vertically (i.e., words having a complete or partial overlap of their X-coordinate value—words visually below other words, or words in the same column—and a small difference in the Y_Bottom_Left value of the first word and Y_Top_Left value of the second word below the first word);

Calculate indentation of sub-paragraphs starting with or without bullets; and/or Calculate Left/Center/Right justification of headers and sub-headers in the document.

The system then scans the word coordinates memory to check if any words are repeating in the same X, Y location in the top three lines on every page of the current document. If found, these words are treated as a page header and all words from those lines are deleted from the word coordinates. Similarly, the system scans the word coordinates memory to check if any words are repeating in the same X, Y location in the bottom three lines on every page of the current document. If found, these words are treated as a page footer, and all words from those lines are deleted from the word coordinates. This removal of page headers and footers allows the system to extract contiguous information from paragraphs that break at the bottom of one page and continue the top of the next page, as if the page break did not exist. For example, see FIG. 7 to see the effect of this header and footer word deletion in memory, if it could be seen by a person.

Some documents have a single page, for example, HTML pages loaded in Web browsers and EXCEL worksheets have a single page. Other documents may have multiple pages, for example, WORD, POWERPOINT and PDF documents. For multi-page documents, the system re-calculates the Y-coordinates of all words on each page from the first page to the last page, by adding the earlier page's bottom-most Y-coordinate value to Y-coordinate value of every word in the current page and sets the page number of every word coordinate row to "1." This has the effect of "stitching together" the pages into one vertically long virtual page in the word coordinates in system memory. For example, see FIG. 8 for a logical view of how this long virtual page in computer memory would look like to a person if it was viewable.

Certain labels in the user-provided list of labels have a special purpose. For example, the system uses the "Document_Identifier" label's user-provided value to ensure that the current data source has at least one balance sheet type document somewhere in it, i.e., in addition to fax cover pages, auditor's opinion letters, etc. The system scans words in word coordinates in both the horizontal visual direction (for example, same Y-coordinates value and increasing X-coordinates, i.e., within one line, left-to-right) and in the vertical visual direction (for example, next higher Y-coordinate value and increasing X-coordinate, i.e., top-to-bottom across multiple lines and left-to-right within each line) to find wrapped labels. If the current document has no text corresponding to "Balance Sheet," "Statement of Net Position" or "Statement of Net Assets," all further processing is skipped, and the documents is moved to a "No Data-of-Interest in Document" computer folder for later manual review. The system writes an audit log file explaining the result/disposition of the system's attempt to extract data from the data source, along with the reason for that result. This ability allows the system to prevent wrong data extraction from data sources that do not genuinely contain information-of-interest.

For every horizontal or vertical match of word sequence "balance sheet" or its synonyms in word coordinates, the system updates that and all following word coordinate rows to add a "logical (sub) document number" to the page number (for example, the page number is shown as word coordinate array column "Page_No" in FIG. 6). If the balance sheet for "ABC Inc." and the statement of net positions for "XYZ Inc." happened to be in the same input data source, the system treats them as separate sub-documents, just like a person would do. The system fills "1.1" in Page_No for all word coordinates for the "ABC Inc." balance sheet, and fills "1.2" in Page_No for all word coordinates for the "XYZ Inc." statement of net positions. All further processing is done on word coordinate rows for one Page_No only, ensuring that data from the "ABC Inc." balance sheet is not comingled with data from "XYZ Inc." statement of net positions.

The system then makes a backup copy of the word coordinates in memory, so that the original word coordinates may be replenished in memory after processing each label to detect locations of all labels and later to extract their visually related information-of-interest.

The system then scans the word coordinates to find the sequence of words that match all user-provided labels defining information-of-interest. For example, the system finds the sequence of words in word coordinates that match "Fiscal Year 2018" and "Capital Assets," or their user-provided synonyms. These are the column-header and line identifying labels used by a person's eye to detect where the "Capital Assets" for "Fiscal Year 2018" amount is on the page. The system scans word coordinates multiple times to allow for detection of in-line or wrapped labels.

The system scans word coordinates in the natural reading order for the language, i.e., top-to-down (i.e., ascending Y_Bottom_Left values), and within each line (i.e., within words having the same Y_Bottom_Left value) from left-to-right (i.e., in ascending X_Bottom_Left values) for languages that write from left-to-right; and top-to-down (i.e., ascending Y_Bottom_Left values), and within each line from right-to-left (i.e., in descending X_Bottom_Left values) for languages that write from right-to-left.

After finding all user-provided labels defining information-of-interest, the system scans word coordinates again to detect which other words lie in the relationship specified by the user. For example, in FIG. 4, it may be seen that the user has specified that the "Capital_Assets_2018_Amount" is below the label "Fiscal_Year_Column_Identifier" and right of "Capital_Assets_Line_Identifier." The system scans word coordinates to find words that have Y-axis values that are higher than, i.e., below the words "Fiscal Year 2018" (which matched the user-specified label criteria for label "Fiscal_Year_Column_Identifier"), and have X-coordinate values completely or partly overlapping the X-coordinates starting from the letter "F" of "Fiscal" and "8" of "2018." These are the same words that would be visually seen by a person below the column header "Fiscal Year 2018," regardless of whether it is wrapped or is in one line. For example, see FIG. 9 for word coordinates of words that visually lie below the column header "Fiscal Year 2018." It should be noted that the system has thus correctly discarded all other columns in the balance sheet and the data below them at this point. For example, if "Fiscal Year 2019" was also on the page, all words in that column have been temporarily discarded by the system.

The system then applies all additional visual relationships which may be provided by the user using a "and" in the "Information_is_Visually_Related_to_Label(s)" EXCEL worksheet cell. In this example, the user has provided that the information-of-interest, i.e., "Capital_Assets_2018_Amount" is to the right of label "Capital_Assets_Line_Identifier." The system scans the words in word coordinates that were narrowed down from the earlier processed visual relationships. Within this list of remaining words, the system scans the Y-axis value to detect which characters have a complete or partial Y-coordinates overlap with "Capital Assets," which matched the user-provided requirement for "Capital_Assets_Line_Identifier;" and X-coordinates value greater than the last "s" of "Capital Assets," i.e., to the right of "Capital Assets." These are the same words that would be visually seen by a person to the right of the line-identifying label "Capital Assets." Out of the words shown in FIG. 9, only one word lies in the same line and visually to the right of 'Capital Assets," i.e., the word "$3,000." From FIG. 6 it may be seen that the word "$3,000" is the only word that has the same Y_Bottom_Left value as "Capital Assets" (Y_Bottom_Left=299.4 for both words) and has X_Bottom_Left value greater than the X_Bottom_Right of "Assets" from "Capital Assets" (392.8 being greater than 211.5). That is, "$3,000" is the only word that is in the same line as, and to the right of "Capital Assets" and below "Fiscal Year 2018," as would be visually determined by a person. The system temporarily discards all other words (i.e., words from all other lines) from word coordinates. The system has thus correctly determined the information-of-interest value of "$3,000" for the user-provided intent of "Capital Assets for Fiscal Year 2018."

If no words are found in word coordinates after all user-provided visual relationships are applied to word coordinates, it means that the area in the text document was blank, which is normal and valid in many documents.

This human-vision-like artificial intelligence does not require any pre-taught examples or templates, and automatically adjusts to any variation of layouts, including unknown number of pages, unknown number of repeated data occurrences ("sub-documents"), unknown number and sequence/order of sections/subsections/paragraphs, unknown line locations, unknown number of lines, unknown column locations, unknown number of columns, and unknown page breaks. For example, see FIG. 10 for column label "Fiscal Year 2018" and row label "Capital Assets" coming together like human-vision to isolate the correct information-of-interest, despite the layout variations.

It should be noted that the user-provided "Information_is_Visually_Related_to_Label(s)" value "Below Fiscal_Year_Column_Identifier and RightOf Capital_Assets_Line_Identifier" could also have been provided as "Right of Capital_Assets_Line_Identifier and below Fiscal_Year_Column_Identifier," and the correct amount "$3,000" would still be found correctly. The order of scanning and discarding word coordinates would be different, but the words remaining in the visual intersection of the column header and line identifier would be the same at the end.

Then, the system sorts the final information-of-interest words by their original visual appearance sequence, i.e., by Y_Bottom_Left ascending (which is top-to-down), and within each line (i.e., for all words having the same Y_Bottom_Left) by X_Bottom_Left ascending (which is left-to-right). Then the system concatenates these words together into a single string, with one space character inserted between each word, and copies them from the memory to an output area to be written as an XML.

By convention, some information-of-interest does not have an explicit label. For example, the company name "ABC Inc." does not have an explicit label "Company Name:" to its left. In such cases, the system uses a well-known programming technique called "Regular Expressions (RegExp)" to find a sequence of words that match a user-provided pattern of characters. In FIG. 4, in Excel Worksheet row 13 of the user-provided labels, it may be seen that the user has provided a RegExp pattern "RegEx=[a-zA-Z0-9&] *(INC\|Incorporated)," meaning "any sequence of characters from a-z (lowercase alphabetic characters) or A-Z (uppercase alphabetic characters) or a number from 0-9 or the character "&" or the space character; followed by "INC." or "Incorporated." The user has also provided the visual label relationship "SameAs Company_Name_Identifier" in EXCEL worksheet row 5, i.e., "treat any words matching the label themselves as the value for this information-of-interest." In the example of "ABC Inc." balance sheet, the character string "ABC Inc." will match the user-provided Regular Expression and "ABC Inc." becomes the extracted data value in the XML output area. Any other data that does not have an explicit label may be extracted in a similar manner using Regular Expressions. Examples of such non-labeled fields are dates, addresses, names, designations and titles (for example, "Manager").

After processing all user-provided information-of-interest rows from the EXCEL worksheet, the system writes the extracted output data as an XML file to a user-provided path. The name of the XML file in this path is the same as the name of the input document, so that the data extracted into the XML may easily be matched to the original source document if needed. The data in the XML may be processed using conventional programming techniques. For example, the "Capital Assets" for "Fiscal Year 2018" amount in the XML may be saved to databases, spreadsheets or used in calculations, decisions and displays.

In addition to the extracted values of all user-provided Information_of_interest fields, the system also includes the following data in the XML for audit purposes:

The path and name of the input document as XML tag "<SOURCE_FILE_NAME>";

The logical page number (i.e., the "sub-document number") from word coordinate rows where the extracted data was found, as XML tag "<PAGE_NUMBER>";

The extraction name provided by the user in the top of the EXCEL worksheet, as XML tag "<PAGE_EXTRACTION_NAME>";

Processing messages, if any, as XML tag "<PROCESSING_MESSAGES>";

If a user-provided label was not found in a particular document, this XML tag will contain the string "* Label '<user provided Label Name>' is missing from the page or the synonym of the label used in this document needs to be added to label synonyms *;"

The extraction processing result, as XML tag "<PROCESSING_RESULT>;" and/or

If the document was recognized as a document of interest, i.e., the user-provided "Document_Identifier" label was found in the document, the value in this tag is "Successful." If the document did not match any attempted Document_Identifiers, the value in this tag is "Unknown document." In this case, all Information_of_Interest XML tags will be present in the XML, but will have an empty (blank) value.

For example, see FIG. 12 for an example of the output XML for the ABC Inc. balance sheet. The user could have chosen to include any other balance sheet line identifiers and column header identifiers in the EXCEL worksheet, for example, "Cash for Fiscal Year 2019," and those additional information-of-interest data values would have been present in this XML.

Additional extraction instructions may be applied to the same source document. For example, a financial statement may contain both "balance sheet" pages as well as "income statement" pages. Information-of-interest of different types may be extracted from the balance sheet pages and from the income statement pages after they are combined in the system memory, in word coordinates. The output XML combines all information found in the entire sub-document as a single output. For example, see FIG. 13 for an example of a tax return containing both income statement and balance sheet as subsequent pages, and the extracted data XML. In this example, the user wanted only three amounts from the income statement section and all amounts from the balance sheet section, under the desired columns. It should be noted that the XML node values are correctly empty for balance sheet lines that are empty in the tax return, for example, "Grants Receivable." If this amount is filled in other tax returns, it will get extracted in the XML.

The system then repeats the steps described above for other documents.

So far, the basic design and overall behavior of the system has been described. The system has additional human-vision-like capabilities that are included in the basic steps described above. These additional capabilities are described in greater detail below.

The system scans word coordinates for words on the same line (i.e., having the same Y_Bottom_Left value) and having the same font name, size, color (for example, "BCDGEE+Calibri" and Stroke Color "0", for example, as shown in FIG. 6), and calculates the average width of characters within that word string, i.e., the sum of lengths of all words, divided by the total number of characters in those words (for example, it should be noted that the length of each word is the difference between its X_Bottom_Right and its X_Bottom_Left). Then it calculates how long a gap between consecutive characters must be for a person to visually treat it as a "word gap," i.e., where one word ends and the next word starts, as the calculated value (for example, average-width-of-character-in-word-string multiplied by 2). For ease of reference, this calculated value will be referred to as a "one-space-width." The system then calculates the "one-line-height" as the height of each word (for example, it should be noted that the height of each word is the difference between its Y_Bottom_Left and its Y_Top_Left). The system also calculates "new-section-gap" as one-line-height multiplied by 2.5. The system thus has the ability of scanning word coordinates and electronic view to detect large empty spaces between words (i.e., more than one-space-width horizontal gap between adjacent words in the same line), large empty gaps between lines (i.e., more than one-line-height vertical gap between adjacent lines), and the larger gaps between sections, which a person treats as visually separate (i.e., unrelated to each other) pieces of data.

While the "ABC Inc." balance sheet example described in detail above had two "anded" visual relationships for the information-of-interest "Capital_Assets_2018_Amount," i.e., "Below Fiscal_Year_Column_Identifier and Right of Capital_Assets_Line_Identifier," the system may handle any "anded" combination of one or more of the following visual relationships provided by the user in the "Information_is_Visually_Related_to_Label(s)" EXCEL column:

With respect to the "below label" issue, the system extracts words having Y_Top_Left greater than Y_Bottom_Left of the matched label words and X-coordinates overlapping the X span (i.e., horizontal word width) of the label words (i.e., words visually directly below label). For example, below words matching the Label_Name "Fiscal_Year_Column_Identifier", i.e., below the words "Fiscal Year 2018" or "FY 2018," whichever is present in the document, as described above.

With respect to the "above label" issue, see FIG. 11 for an example of a loan application form's signature section having data above the labels. The system extracts words having Y_Bottom_Left less than Y_Top_Left of the matched label words and X-coordinates overlapping the X span (i.e., horizontal word width) of the label words (i.e., words directly above label).

With respect to the "right of label" issue, the system extracts words having X_Bottom_Left greater than X_Bottom_Right of the matched label words and Y-coordinates overlapping the Y span (i.e., vertical word height) of the label words (i.e., words to the right of label, in the same line as the label). For example, words right of words matching the Label_Name. "Capital_Assets_Line_Identifier," i.e., right of the words "Capital Assets" or "Assets-Capital," whichever is present in the document, as described above.

With respect to the "left of label" issue, the system extracts words having X_Bottom_Right less than X_Bottom_Left of the matched label words and Y-coordinates overlapping the Y span (i.e., vertical word height) of the label words (i.e., words to the left of label, in the same line as the label).

With respect to the "same as label" issue, the system extracts the matched label words themselves (matched using Regular Expressions), as described above to find "ABC Inc." from the "ABC Inc. balance sheet" example.

With respect to the "related to label" issue, this is the most intelligent aspect of the system's artificial intelligence capability. The system intelligently decides which other words are visually related to the user-provided label, without needing the user to provide the direction of the visual relationship, i.e., without needing the user to provide right of, left of, below, above and/or same as input. This is useful when the information-of-interest is sometimes below the label and sometimes to the right of the label. For example, see FIG. 14A to see an example of a shipping document showing the "BILL OF LADING NO." below the label, and FIG. 15A to see an example of another shipping document showing the "BILL OF LADING NO." to the right of the label. See the detailed description of this system feature set forth below.

With respect to the "all related to label" issue, this relationship works like "related to." Additionally, it isolates and extracts all vertically repeated occurrences of the information-of-interest. It is useful to extract rows and columns from tables or grids that have unknown number of rows.

For information-of-interest identified by the user using the "related to" visual relationship, the system locates the user-provided label in word coordinates. Then the system scans word coordinates for all words lying in an area visually below (i.e., words having larger Y_Top_Left values than the Y_Bottom_left of the label) or visually to the right of the matched label words (i.e., words having larger X_Bottom_Left values than the X_Bottom_Right of the label) and marks them as data words potentially related to the label for languages that write from left-to-right. The system scans word coordinates for all words lying in the area visually below (i.e., words having larger Y_Top_Left values than the Y_Bottom_left of the label) or visually to the left of the matched label words (i.e., words having lower X_Bottom_Right values than the X_Bottom_Left of the label) and marks them as data words potentially related to the label for languages that write from right-to-left. For ease of reference, the area containing these potentially related words will be referred to as the "inclusion-area" for that label.

The system isolates all words in the inclusion-area for extraction, except words lying farther than a one-space-width horizontal gap or a more than one-line-height vertical gap away from other words in the inclusion-area that are closest to the label. For example, see FIG. 14A for an example of words in a shipping document. For example, see FIG. 14B for an example of large horizontal gaps between words that are wider than one-space-width. For example, see FIG. 14C for an example of large vertical gaps between lines that are wider than one-line-height. For example, see FIG. 14D for the inclusion-area of the label "BILL OF LADING NO." (it should be noted that the inclusion-area is shown in gray shading). For example, see FIG. 14E for the actual words visually related to the label and correctly isolated by the system after correctly excluding words beyond large vertical and horizontal gaps. Only the correct word "MSCUMA882580" is thus included as the extracted information-of-interest for the label "BILL OF LADING NO." For example, see FIG. 14F for an example of user-provided label "vessel name" correctly resulting in extracted information-of-interest value "MSC STELLA" because the gap between "MSC" and "STELLA" is not large, i.e., it is narrower than one-space-width. The system thus emulates human vision and correctly deduces which nearby, visually contiguous words are part of data related to a label and which noncontiguous words are unrelated data.

For example, see FIG. 15B for the Inclusion-Area of the label "BILL OF LADING NO." in another shipping document. Because the system locates all user-provided labels in word coordinates before looking for the visually related information-of-interest for each label, it also correctly detects and excludes words that lie in the inclusion-area of any other adjacent label. For example, see FIG. 15C to see how the system includes "COSU6185036700" as the related data for label "BILL OF LADING NO." and excludes the word "4359040081005300" because it lies in the inclusion-area of another user-provided label, i.e., "SHIPPER REFERENCE:".

Additionally, for all visual relationships, while looking for visually related words to any label, the system excludes words that matched a user-provided "Label_Text_and_Synonyms" value. Encountering a label halts the system's scan in that direction, but continues in other directions, until a large gap or another label is encounters in that direction. For example, in FIG. 14D, it may be seen that the first word encountered within the inclusion-area for label "BILL OF LADING NO." is another label, i.e., "PRINT DATE," so the scan towards the right stops, but the scan towards the bottom of label "BILL OF LADING NO." continues, successfully picking up the desired information-of-interest word "MSCUMA882580." The large gap below it (i.e., greater than one-line-height gap shown in FIG. 14C) halts the word coordinates scan towards the bottom.

Thus, simply by providing all typical labels (and their synonyms) that could be present in the source document of a certain type, and choosing the "related to" option in the "Information_is_Visually_Related_to_Label(s)" column in input EXCEL worksheet, the user may let the system handle any unknown data layout with highly accurate isolation and extraction of information-of-interest.

For example, see FIG. 16A for an example of a section of a resume (i.e., a Bio-data or a Curriculum Vitae). The system behavior described so far will extract only the right half of each line because only those words lie in the inclusion-area of the label "SPECIALIZED SKILLS." For example, see FIG. 16B for the inclusion-area shown in gray shading.

After isolating those words (for example, see FIG. 16C for words originally isolated form the inclusion-area), the system sorts them in their original visual order (i.e., by Y_Bottom_Left ascending and within each line by X_Bottom_Left ascending). For the "above," "below" and "related to" user-provided visual relationships, for each line (i.e., for each distinct Y_Bottom_Left value for the words in the Inclusion-Area) the system scans the words to the left and detects the series of contiguous words where each word lies less than one-space-width away from the word to its right. The system adds these additional contiguous words on the left to the words isolated for extraction as information-of-interest. Additionally, for the "above" user-provided visual relationship, for each line (i.e., for each distinct Y_Bottom_Left value for the words in the inclusion-area) the system scans the words to the right of the rightmost word on that line in the inclusion-area and detects the series of contiguous words where each word lies less than one-space-width away from the word to its left. The system adds these additional contiguous words on the right to the words isolated for extraction as information-of-interest.

Then, the system sorts the final information-of-interest words by their original visual appearance sequence, i.e., by Y_Bottom_Left ascending (which is top-to-down), and within each line (for all words having the same Y_Bottom_Left) by X_Bottom_Left ascending (which is left-to-right).

For example, see FIG. 16D for an example of all words that are isolated from the "SPECIALIZED SKILLS" section of the resume at the end, just like a person would determine visually. Then, the system concatenates these words together into a single string, with one space character inserted between each word, and copies them from the memory to an output area to be written as an XML. For example, see FIG. 16E for the final extracted information-of-interest as it would appear in the output XML.

Many sets of information are presented as a table or a grid. For example, see FIG. 17A for an example of a table on a shipping container journey tracking Web page. Different container journeys show different numbers of rows in the table, depending upon how recently the journey has started. The "status" shown on each line is different for different containers. For example, see FIG. 18 for an example of the user-provided rules that use the "all related to" relationship. "All" tells the system to look for unknown number of repetitions of each row. Also it should be noted that the "Information_is_Visually_Related_to_Label(s)" column of the user-provided labels have values like "Shipment_Progress_Section_Identified/Journey_Event_Date_Column_Header." Because "date" is a very common word, it is possible that the system will find an earlier, wrong match on "date" (for example, see in FIG. 17B that an unrelated section above the table has the text "Detention Freetime Expiry Date") and will extract bad data near that wrongly matched label location. Providing "Shipment_Progress_Section_Identifier// . . . " tells the system to first find the text matching the user-provided "Shipment_Progress_Section_Identifier" label or its synonym and then find the "date" label visually below that location in the document (i.e., the word "date" having Y_Top_Left greater than the Y_Bottom_Left found for "Shipment Progress"). Any number of "//" may be provided to identify sections, subsections, columns etc. to precisely find the actual location of information-of-interest, correctly ignoring occurrences of the same subsection and label words elsewhere. Thus, this system feature visually finds the correct starting point in the source document, regardless of unknown data above and below the section containing information-of-interest.

To extract data from a table, the system identifies all user-provided column header labels and scans the word coordinates for words in each label's inclusion-area. Contiguous words on the left of the leftmost word in each line of the inclusion-area on the left are also included as explained in an earlier paragraph using the resume "SPECIALIZED SKILLS" section example. The system correctly excludes words that are more than one-space-width away horizontally and more than one-line-height vertically. This isolates the information of interest for each column for the first row in the table, which is written to the extraction output area as one row. However, because the user has provided "all" in "all related to," the system continues to scan word coordinates below the last extracted word in each column and keeps isolating the information of interest for each column for the next row in the table, which is written to the output area as the next row. This continues until the system finds either another label or a vertical gap that is more than the calculated new-section-gap. For example, see FIG. 19 for a view of the table in the Web page, with vertical gaps between rows used to start new extracted rows, and the bigger gap at the bottom of the table to end table extraction. For example, see FIG. 20 for an example of the XML extracted by the system from the table from the Web page shown in FIG. 17A.

Note that the user may provide any desired names for the XML nodes/tags and their order in the "Information_of_Interest" column in the input EXCEL worksheet. For example, "mode" is the third tag in each table row's XML, even though it is the fifth column in the table in the Web page. The use could also have omitted any of the table columns if they were not of interest, without affecting the accuracy of the extraction of data in columns of interest.

The same user-provided rules may be re-used for shipping container journey tracking on a completely different Web site, simply by ensuring that the label synonyms used by that Web site are included in the user-provided Label_List in the input EXCEL worksheet. For example, see FIG. 21 for another shipping company's Web page showing container journey status events in a table having different section headers and column headers, and a different column order from left-to-right in the table on the Web page. For example, see FIG. 22 showing the updated user-provided Label_List EXCEL worksheet. The user has now provided the synonym "tracking details for container" for Label_Names "Document_Identifier" and "Shipment_Progress_Section_Identifier," synonym "vessel" was provided for Label_Name "Journey_Event_Mode_Column_Header" and synonym "moves" was provided for Label_Name "Journey_Event_Status_Column_Header." This user-provided EXCEL worksheet may now correctly extract data from either shipping Web site and put it in a consistently formatted output XML. Thus, the system requires minimal user inputs to accurately isolate and extract the same functional data from very different information layouts.

Certain document types allow edits or updates to the document, for example, Web pages that allow a user to enter a search term, PDF and Word Forms that have fields that may be filled and saved by the user, and EXCEL worksheets where values may be entered in cells. There are well-known, readily available programming APIs provided by MICROSOFT and ADOBE, and automation solutions like RPA, to automate edits, entries, updates and clicks to user-enterable fields (for example, input boxes, drop-down lists, radio buttons and clickable button like 'Submit" or "Save") on Web pages, on PDF and WORD Forms, and in EXCEL worksheets. For example, a "submit" button on a Web page may be clicked automatically using the APIs to start a search on the Web page. However, initial examples must be shown for each Web page, each PDF and WORD form format, and each EXCEL worksheet that needs automated updates or entries, for the RPA to remember the location or other technical descriptors of each field where data needs to be entered automatically in the future. For example, the technical descriptors of an HTML tag, like "id," "name," "Tag-path-from-root" or "Xpath" are used by RPA to remember which data to put where on that Web page in the future. PDF and WORD forms have hidden technical field-descriptors, and EXCEL has "range" or cell row and column information, which the RPA remembers for future data entry. If the locations or technical descriptors change in the source document, the automation gives an error. If the future location is infinitely variable, for example, if an entire section of an EXCEL worksheet may move up or down, depending on the number of rows in an earlier section, the location of the user-enterable cell may not be pre-determined, making the "pre-taught examples" approach completely useless.

In contrast, the system simply reads user-provided labels and automatically finds the actual field in the document where the user-provided input value should be entered, despite unknown locations of those input fields in each document and without looking at technical descriptors. The same visual label-to-field relationships described above, i.e., "anded" combination of one or more of "below label, above label, right of label, left of label, same as label and related to label," may be used to identify fields to edit/enter and buttons to click. For example, see FIG. 23 for examples of multiple Web pages where the input fields, and the correct button on the Web page are found by the system, to be filled and clicked using the standard well-known APIs to trigger an automated search for list of companies matching the entered search term. The system works correctly even if the Web pages change their layouts or the underlying technical descriptors change. For example, see FIG. 24 for user-provided labels and synonyms that may find the correct search input box and the correct search button in unknown "business search" pages, using the related to visual relationship. The system determines the related to visual relationship between user-provided labels and the related fields/buttons by scanning word coordinates as already described above. The search results from each business search Web page may then be isolated and extracted correctly despite the variation in the search result table formats, like the multiple shipping container journey event status table extraction from different shipping Web sites, already discussed in earlier paragraphs. The system thus provides a superior result compared to ML and RPA, by avoiding the need for examples, and by reliable, automatic re-determination of information-of-interest even when the source document layouts or technical descriptors change.

The system may find labels and visual relationships in any natural language and extract data as XML for additional processing by conventional computers.

Because all system processing is in the computer memory, no viewable actions happen on the desktop/screen of the computer running the system. Multiple documents may be simultaneously processed in parallel from a single computer.

The system allows additional process controls provided by the user simplify processing. An example of some of the user-provided control parameter values are shown in FIG. 25. Here is a brief explanation of the controls:

Input Documents Path—Path to read local source documents for processing;

Input Web Pages URLs—Location of URL to load source Web pages for processing;

Path to move successfully processed documents—Destination path to move successfully processed source documents;

Path to move irrelevant documents—Destination path to move documents that did not match any of user-provided Document_Identifiers, for manual review of the documents;

Path to move documents requiring OCR—If the system finds no words in the document, the document must be an image. It may be converted to text using Optical Character Recognition (hereinafter referred to as "OCR") for re-processing by the system. This is the destination path to move such documents, i.e., input to the OCR engine;

Allow partial label string matches—If set to 'true," this allows a shorter user-provided label or synonym string to match a longer label string in the source document. For example, "business name" will match "business name" on one Web site and will match "Business Name or ID" on another Web site. This reduces the user's work of finding exact label word spellings in varying source documents;

Allow label upper/lower case variance—If set to 'True", this allows a user-provided label or synonym string to match the same string in the source document despite uppercase or lowercase (i.e., capital letters or small letters) variation. For example, "tracking number" will match "TRACKING NUMBER" in a WORD document (and vice versa);

Allow inexact matches above similarity %—Sometimes badly scanned images result in non-exact text from OCR. For example, the original words "Capital Assets Amount" may appear as "Capital Assets Amount" after OCR (note the number "1" in this "OCRed" text). The system has the ability of allowing slight variations between the expected and actual label words. A user-provided similarity of 95% allows the system to ignore one mismatched character out of a string of 20 characters (i.e., 5% mismatch, 95% match) and still find correct labels with a 95% confidence. If the user provides a value of "100" in this parameter, the system uses only exact matches to find labels;

New line marker—Sometimes it is useful to know where a line break was in the source document. This is useful for parsing/splitting information-of-interest that conventionally appears as multiple lines, for example, an address block. The user may provide an optional string here, which the system uses to mark places in the extracted data where the data wrapped to a new line in the source document. For example, see FIG. 16F for a finally extracted string for information-of-interest visually related to label "SPECIALIZED SKILLS" as it would be in output XML, with user-provided value "##NEWLINE ##" to indicate original placement of line-breaks; and/or Minimum number of dark pixels in checked checkbox or radio button—Once the system finds the unknown location of the labels describing a checkbox or a radio button in a source document, it may use the actual location of the labels to find the checkbox or radio button itself and save its cropped image to a local folder. Then the system counts the dark pixels in that saved image using a well-known, readily available API called MICROSOFT System.Drawing. If the number of dark pixels in the locally saved image is greater than this user-provided control value, the system writes the value "True" in the output XML for this information-of-interest; otherwise it writes "False" in the output XML. This is just like a person's eyes noticing the dark area in a checked check box or a clicked radio button. For example, see FIG. 26 for an example of multiple checkboxes that are visually described by column headers and line identifiers. For example, the user will provide the visual relationship "Below Declarations//Borrower//Yes and RightOf Are_You_a_Party_To_a_Lawsuit as Image" to tell the system find the line/column visual intersection, crop that area's image, count the dark pixels and decide if the checkbox has a dark mark in it or not. A good cutoff value for this parameter is "40," though it may be controlled by the user. In this example, the number of dark pixels in the cropped intersection image is 32, i.e., less than 40; hence, the system will correctly mark "False" in the output XML.

Additional system capabilities include, but are not limited to:

Using the already described ability of detecting horizontal and vertical gaps between words, lines and columns, the system may detect and extract every table/grid in a document. In this case, the user simplify specifies "Extract_All_Tables" as an additional option. The system detects columns separated by contiguous vertical white spaces, uses this white space to decide the height of the entire table from its start to its end, further detects rows in the table, to extract every cell in the table. For example, see FIG. 27 for an example of a table having previously-unknown headers, columns and rows even to a user. For example, see FIG. 28 for the system's ability of extracting data with actual column headers as XML data values;

The system may compare the X-axis value of the first word of each line in the word coordinates and decide if that first word has shifted to the left or right of the first word in the previous line. In effect, the system may detect indentation of lines. By evaluating the first few characters of each line for uppercase/lowercase, the characters themselves and their alignments, the system detects author-specified hierarchies of bullets and indentations of sub-paragraphs. This allows the system to scan the totality of the document with the human-like awareness of parent concepts described in upper paragraphs and their additional but distinct features as described in indented and bulleted sub-paragraphs. Bullets are used by many authors to specify content or concepts that relate to their parent paragraph but are themselves distinct from each other. This allows the system to logically understand which paragraphs should be included or excluded to detect combinations of multiple concepts. For example, see FIG. 29 for an example of a legal contract having nested clauses. Assume that the business need is to scan thousands of legal contracts to find vendors who have agreed to the clause "The Vendor shall obtain automobile liability insurance with limit of 2 million dollars per accident from a company rated at minimum A− by AM Best." To answer this question entered by a user in a system-accessible mechanism like an EXCEL worksheet or a text file, the system creates and scans the word coordinates of each contract document for a match first on "Automobile liability insurance" (in the example shown in FIG. 29 it is found in document section hierarchy specified by the author as "14.13 b."). Then, the system expands the search in the word coordinates to find the match within the same paragraph for "USD 1 million," and then expands the search in the word coordinates again to find "AM Best" in the paragraph above. But, importantly, the system detects that the intervening sub-paragraph about "Commercial General Liability insurance" starts with a similar bullet "a." as the earlier found bullet "b.", it deduces that it is illogical that content of bullet "a." be relevant to content of its sibling bullet "b." (for example, the author would not have used bullets if they were logically related paragraphs, i.e., describing the same concept with more detail; rather, the author would have used paragraphs without bullets for that purpose.) In this example, the system would correctly return with the result of "false" to the question "does this contract with this vendor says the vendor has agreed to the clause 'The Vendor shall obtain automobile liability insurance with limit of 2 million dollars per accident from a company rated at minimum A− by AM Best.'" That is, as shown in FIG. 30, the system correctly includes the actual value "1 million" and correctly excludes the nearby intervening value "2 million" because it is in another bullet. This human-like ability of detecting the author-intended interpretation of complex text across sentences, paragraphs, sections and pages of a document allows the system to automatically find answers to any number of questions across thousands of documents, to greatly reduce the need for a person to read all of these documents.

As an additional example of human-like ability of correctly linking dispersed logical concepts across paragraphs, for example, see FIG. 31. The example shows a section from a legal contract commonly used in the banking industry, for loans between companies and banks. A commonly used interest rate standard called "LIBOR" will be discontinued in 2022. Thousands of contracts need to be scanned to determine what is the legal clause that handles this change, i.e., the question "What happens to this contract if the LIBOR standard is no longer used?" needs to be answered for each contract. As shown in FIG. 32, the system may detect that the word "then" in the bottom paragraph is lower case and is exactly at the same indentation as the top paragraph and hence it must be a continuation of the top paragraph, just like a human user would. The system finds the starting word "LIBOR," then finds the nearby phrase "no longer made available," expands the search to the parent i.e., the top paragraph and correctly includes the bottommost paragraph because it is a continuation of the top paragraph (correctly ignoring the unrelated bulleted paragraphs in between) and finds the answer to the question, i.e., finds the reference "replace LIBOR with an alternate benchmark rate" is what happens to this contract.

In some applications, the present invention described above may be provided as elements of an integrated software system, in which the features may be provided as separate elements of a computer program. Some embodiments may be implemented, for example, using a computer-readable storage medium (e.g., non-transitory) or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the features described above need be provided or need be provided as separate units. Additionally, it is noted that the arrangement of the features do not necessarily imply a particular order or sequence of events, nor are they intended to exclude other possibilities. For example, the features may occur in any order or substantially simultaneously with each other. Such implementation details are immaterial to the operation of the present invention unless otherwise noted above.

The exemplary methods and computer program instructions may be embodied on a computer readable storage medium (e.g., non-transitory) that may include any medium that may store information. Examples of a computer readable storage medium (e.g., non-transitory) include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

Furthermore, a software program embodying the features of the present invention may be used in conjunction with a computer device or system. Examples of a computing device or system may include, but are not limited to, an electronic book reading device, a computer workstation, a terminal computer, a server computer, a handheld or mobile device (e.g., a tablet computer, a personal digital assistant "PDA", a mobile telephone, a Smartphone, etc.), a Web appliance, a network router, a network switch, a network bridge, any machine capable of executing a sequence of instructions that specify an action to be taken by that machine, and any combinations thereof. In one example, a computing device may include and/or be included in, a kiosk.

As used herein, the term "mobile device" is intended to encompass any form of programmable computing device as may exist, or will be developed in the future, that implements a communication module for wireless voice and data communications, including, for example, cellular telephones, personal data assistants (PDA's), palm-top computers, laptop, and notebook computers, wireless electronic mail receivers (e.g., the BLACKBERRY™ and TREO™ devices), multimedia Internet enabled cellular telephones (e.g., the BLACKBERRY STORM™, and similar personal electronic devices that include a wireless communication module, processor and memory.

The computer device or system may also include an input device. In one example, a user of the computer device or system may enter commands and/or other information into computer device or system via an input device. Examples of an input device may include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. The input device may be interfaced to bus via any of a variety of interfaces including, but not limited to, a serial interface, a parallel interface, a game port, a USB interface, a FIREWIRE interface, a direct interface to bus, and any combinations thereof. The input device may include a touch screen interface that may be a part of or separate from the display.

A user may also input commands and/or other information to the computer device or system via a storage device (e.g., a removable disk drive, a flash drive, etc.) and/or a network interface device. A network interface device, such as network interface device may be utilized for connecting the computer device or system to one or more of a variety of networks and/or one or more remote devices connected thereto. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, etc.) may be communicated to and/or from the computer device or system via a network interface device.

The computer device or system may further include a video display adapter for communicating a displayable image to a display device, such as a display device. Examples of a display device may include, but are not limited to, a liquid crystal display (LCD), a cathode ray tube (CRT), a plasma display, a light emitting diode (LED) display, and any combinations thereof. In addition to a display device, the computer device or system may include one or more other peripheral output devices including, but not limited to, an audio speaker, a printer, and any combinations thereof. Such peripheral output devices may be connected to a bus via a peripheral interface. Examples of a peripheral interface may include, but are not limited to, a serial port, a USB connection, a FIREWIRE connection, a parallel connection, and any combinations thereof.

As shown in FIG. 33, an illustrative schematic flow is shown of data/information received by the computer through its input device and the data/information received by the user through the output device. I/O devices are usually hardware devices that are used to feed and/or receive data/information from the computer either through its memory or from the workstations, servers or any similar computer device to which the computer is connected via router-modem combination. These servers may be provided to the users under a secure environment through various security walls that do not allow the unauthorized access of data outside the network.

The input devices (e.g., monitor, keyboard, mouse, mobile device and/or the like) accept the List of Unstructured Data Sources and the List of Labels/synonyms fed by the user and make them accessible to the computing device on which the System can do its processing. The System's output XML Output Containing Extracted Data and Audit Log with success/failure are converted into a human-readable form and is accessible through output devices (e.g., monitor, keyboard, mouse, mobile device and/or the like). The same data/information may be further stored on the server through the local area network (LAN) of that computer. The data/information may be shared among various devices sharing the same LAN. A router allows the connection between the LAN and the various devices under the same network. The modem further allows the connections with the Internet thus connecting these devices to the server. The data/information stored on the server may be accessed through such an Internet connection and may be shared on various devices under one LAN. All this information is accessible through the output device/unit of the computer. A number of servers may be connected to one LAN through one router-modem combination and a number of LAN's may be connected to one server through a number of router-modem combinations. The flow of data/information is a two-way flow through the I/O devices. When received in the binary form it is processed by the processor and made available to the user. The same is with the data/information stored or retrieved from the server.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for automatically searching, isolating and extracting information-of-interest from single or multi-page, unknown layout, unstructured text data sources, comprising the steps of:
   providing a first computer processing system, comprising:
      a computer processor unit; and
      a non-transitory computer readable medium operably associated with the computer processor unit, the non-transitory computer readable medium storing instructions executable by the computer processor unit to perform the steps of:
         inputting a first list of the single or multi-page, unknown layout, unstructured text data sources;
         inputting a second list of information-of-interest to be detected, isolated and extracted from the single or multi-page, unknown layout, unstructured text data sources, wherein the second list includes a list of labels;
         processing the first list of single or multi-page, unknown layout, unstructured text data sources using the list of labels;
         outputting a report containing all detected, isolated and extracted information-of-interest as defined by the list of labels;
         optionally, outputting an audit log file stating success or failure of the data extraction;
         optionally, feeding the report to a second computer processing system for further processing; and
         determining and storing a user visible pixel location of each word in the single or multi-page, unknown layout, unstructured text data sources in a memory of the first computer processing system, wherein the determining step includes using a pixel left-right axis and a pixel up-down axis as a word coordinate point to establish the pixel location of each word.

2. The method according to claim 1, further comprising the steps of:
   sorting the word coordinate points first by page number, within that by an up-down axis value so as to arrange all words in one line together and arrange the lines on one page from top-to-down, and within that by the left-right axis value of each word so as to arrange all words in one line from left-to-right in the of the memory of the first computer processing system; and
   creating an electronic replica of an actual data layout that would be seen by a user in the memory of the first computer processing system.

3. The method according to claim 2, further comprising the step of:
   locating words visually in the same horizontal line as any other words having at least a partially overlapping left-right axis value.

4. The method according to claim 2, further comprising the step of:
   locating words visually in the same vertical column as any other words having at least a partially overlapping up-down axis value.

5. The method according to claim 2, further comprising the step of:
   calculating a width of horizontal gaps between words in the same horizontal line.

6. The method according to claim 2, further comprising the step of:
   calculating a height of vertical gaps between words in adjacent lines.

7. The method according to claim 2, further comprising the step of:
   calculating a distance between words to see which words are visually adjacent each other horizontally.

8. The method according to claim 2, further comprising the step of:
   calculating a distance between words to see which words are visually adjacent each other vertically.

9. The method according to claim 1, wherein the single or multi-page, unknown layout, unstructured text data sources include an unknown number of pages.

10. The method according to claim 1, wherein the single or multi-page, unknown layout, unstructured text data sources include an unknown sequence of pages.

11. The method according to claim 1, wherein the processing step further comprises searching, isolating and ignoring intervening page headers and footers to extract contiguous information-of-interest from consecutive pages of the single or multi-page, unknown layout, unstructured text data sources.

12. The method according to claim 1, wherein the processing step further comprises searching, isolating and extracting an unknown number, lengths and indentations of sections or paragraphs from the single or multi-page, unknown layout, unstructured text data sources.

13. The method according to claim 1, wherein the processing step further comprises searching, isolating and extracting information-of-interest from tabular data with an unknown number of rows and column sequences from the single or multi-page, unknown layout, unstructured text data sources.

14. The method according to claim 1, wherein the processing step further comprises searching, isolating and extracting information-of-interest from multiple text paragraphs of the single or multi-page, unknown layout, unstructured text data sources, with the capability to detect and ignore intervening information that is not of interest to a user.

15. A method for automatically searching, isolating and extracting information-of-interest from single or multi-page, unknown layout, unstructured text data sources, comprising the steps of:
providing a first computer processing system, comprising:
a computer processor unit; and
a non-transitory computer readable medium operably associated with the computer processor unit, the non-transitory computer readable medium storing instructions executable by the computer processor unit to perform the steps of:
inputting a first list of the single or multi-page, unknown layout, unstructured text data sources;
inputting a second list of information-of-interest to be detected, isolated and extracted from the single or multi-page, unknown layout, unstructured text data sources, wherein the second list includes a list of labels;
processing the first list of single or multi-page, unknown layout, unstructured text data sources using the list of labels;
wherein the processing step includes:
determining and storing a user visible pixel location of each word in the single or multi-page, unknown layout, unstructured text data sources in a memory of the first computer processing system, wherein the determining step includes using a pixel left-right axis and a pixel up-down axis as a word coordinate point to establish the pixel location of each word;
outputting a report containing all detected, isolated and extracted information-of-interest as defined by the list of labels;
optionally, outputting an audit log file stating success or failure of the data extraction; and
optionally, feeding the report to a second computer processing system for further processing.

16. The method according to claim 15, further comprising the steps of:
sorting the word coordinate points first by page number, within that by an up-down axis value so as to arrange all words in one line together and arrange the lines on one page from top-to-down, and within that by the left-right axis value of each word so as to arrange all words in one line from left-to-right in the of the memory of the first computer processing system; and
creating an electronic replica of an actual data layout that would be seen by a user in the memory of the first computer processing system.

17. The method according to claim 16, further comprising the step of:
locating words visually in the same horizontal line as any other words having at least a partially overlapping left-right axis value.

18. The method according to claim 16, further comprising the step of:
locating words visually in the same vertical column as any other words having at least a partially overlapping up-down axis value.

19. The method according to claim 16, further comprising the step of:
calculating a width of horizontal gaps between words in the same horizontal line.

20. The method according to claim 16, further comprising the step of:
calculating a height of vertical gaps between words in adjacent lines.

21. The method according to claim 16, further comprising the step of:
calculating a distance between words to see which words are visually adjacent each other horizontally.

22. The method according to claim 16, further comprising the step of:
calculating a distance between words to see which words are visually adjacent each other vertically.

23. A method for automatically searching, isolating and extracting information-of-interest from single or multi-page, unknown layout, unstructured text data sources, comprising the steps of:
providing a parallel computer processing system operable to simultaneously perform the searching, isolating and extracting of the information-of-interest from the text data sources, wherein each computer processing system of the parallel computer processing system comprises:
a computer processor unit; and
a non-transitory computer readable medium operably associated with the computer processor unit, the non-transitory computer readable medium storing instructions executable by the computer processor unit to perform the steps of:
inputting a first list of the single or multi-page, unknown layout, unstructured text data sources;
inputting a second list of information-of-interest to be detected, isolated and extracted from the single or multi-page, unknown layout, unstructured text data sources, wherein the second list includes a list of labels;
processing the first list of single or multi-page, unknown layout, unstructured text data sources using the list of labels;
outputting a report containing all detected, isolated and extracted information-of-interest as defined by the list of labels;
optionally, outputting an audit log file stating success or failure of the data extraction;
optionally, feeding the report to another computer processing system for further processing; and
determining and storing a user visible pixel location of each word in the single or multi-page, unknown layout, unstructured text data sources in a memory of the parallel computer processing system, wherein the determining step includes using a pixel left-right axis and a pixel up-down axis as a word coordinate point to establish the pixel location of each word.

* * * * *